US012306393B1

(12) United States Patent
Hanninen

(10) Patent No.: US 12,306,393 B1
(45) Date of Patent: May 20, 2025

(54) PIXELATED PHASE MASK FOR CHEMICAL IMAGING

(71) Applicant: Adam M. Hanninen, Long Beach, CA (US)

(72) Inventor: Adam M. Hanninen, Long Beach, CA (US)

( * ) Notice: Subject to any disclaimer, the term of this patent is extended or adjusted under 35 U.S.C. 154(b) by 29 days.

(21) Appl. No.: 18/407,576

(22) Filed: Jan. 9, 2024

(51) Int. Cl.
  *G02B 21/36* (2006.01)
  *G01N 21/33* (2006.01)
  *G01N 21/35* (2014.01)
  *G01N 21/63* (2006.01)
  *G02B 21/06* (2006.01)
  *G02B 21/16* (2006.01)

(52) U.S. Cl.
  CPC ........... *G02B 21/365* (2013.01); *G01N 21/33* (2013.01); *G01N 21/35* (2013.01); *G01N 21/63* (2013.01); *G02B 21/06* (2013.01); *G02B 21/16* (2013.01); *G01N 2201/0675* (2013.01); *G01N 2201/0683* (2013.01)

(58) Field of Classification Search
  CPC ...... G02B 21/365; G02B 21/06; G02B 21/16; G01N 21/33; G01N 21/35; G01N 21/63; G01N 2201/0675; G01N 2201/0683
  USPC .......................................................... 348/79
  See application file for complete search history.

(56) References Cited

U.S. PATENT DOCUMENTS

| | | | |
|---|---|---|---|
| 7,230,717 B2 | 6/2007 | Brock et al. | |
| 11,280,727 B2 | 3/2022 | Zhang et al. | |
| 11,480,518 B2 | 10/2022 | Prater et al. | |
| 11,709,352 B2 | 7/2023 | Cheng et al. | |
| 11,774,354 B2 | 10/2023 | Prater et al. | |
| 2018/0052186 A1* | 2/2018 | Su | G01N 21/35 |
| 2020/0103355 A1* | 4/2020 | Smith | H01L 22/20 |
| 2021/0255446 A1 | 8/2021 | Hanninen et al. | |

* cited by examiner

*Primary Examiner* — Allen C Wong
(74) *Attorney, Agent, or Firm* — PITT I.P.; Jacob E. Pittman

(57) ABSTRACT

A system for high-contrast, real-time analysis of a sample includes: a first radiation source configured to emit a first radiation beam onto the sample, wherein the first radiation beam comprises pulsed infrared (IR) light; a second radiation source configured to emit a second radiation beam onto the sample, wherein the second radiation beam comprises ultraviolet (UV) light, visible-spectrum light, or near-IR light; an imager configured to split the second radiation beam into a test field and a reference field; a pixelated phase mask (PPM) configured to introduce a predetermined phase shift between the test field and the reference field; an imaging sensor configured to detect the test field and the reference field and output an electrical signal indicating optical intensities of the test field and the reference field; and processing circuitry configured to generate imagery of the sample based on the electrical signal and the predetermined phase shift.

20 Claims, 15 Drawing Sheets

PIXELATED PHASE MASK FOR CHEMICAL IMAGING

TECHNICAL FIELD

The present disclosure relates to microscopy with photothermal-infrared (PI) contrast.

BACKGROUND

Infrared (IR) spectroscopy is a popular technique for identifying the chemical composition of samples, especially in the form of Fourier-Transform Infrared (FTIR) spectroscopy. When incorporated in a microscope, IR spectroscopy can be used to generate images with molecular contrast, allowing non-destructive, label-free imaging of a wide range of industrial and biological samples with chemical heterogeneity at the >10-micrometer (m) scale. Despite the proven successes of IR imaging, the technique nevertheless suffers from certain practical hurdles limiting its utility. In particular, IR microscopy produces significantly lower resolution than, for instance, visible-light microscopy, due to the longer wavelengths required to resonantly excite molecular vibrations. Additionally, IR cameras suffer from thermal noise, generally feature low pixel densities, and are much less affordable than comparable silicon-based detectors that operate in the visible and near-IR spectra. Fortunately, recent innovations in nonlinear IR spectro-microscopy are poised to overcome these limitations and have laid the foundation for a revolution in rapid, label-free IR imaging. Photothermal-Infrared (PI) microscopy and Third-order Sum-Frequency Generation (TSFG) microscopy have broken the IR-diffraction limit and provide sub-micrometer resolution over the entire Mid-Infrared (MIR) spectral range by encoding long-wavelength MIR photons used to excite vibrational resonances onto short-wavelength photons in the ultraviolet (UV), visible, and near-IR spectra.

PI microscopy has particular advantages, in that it can be deployed in a widefield geometry for true video-rate imaging. A current limitation in the field of PI microscopy is that the photothermal effect can be quite small (e.g., nanometer-scale thermal expansions and ~$10^{-4}$ changes to the refractive index). Observing nanometer-scale changes through intensity-based measurements, e.g., confocal or darkfield, is challenging, requiring many frame averages, which increases light dosage and limits throughput. For this reason, researchers are moving toward phase-based techniques that have sensitivity to Optical-Path Length (OPL) at the nanometer (nm) scale. Quantitative Phase Imaging (QPI) has emerged as a valuable method for investigating unlabeled specimens by providing quantitative maps of OPL delays introduced by the sample with sensitivity inaccessible through intensity measurements. Although there are many variations of QPI, the most significant approaches benefit from a common-path geometry for mechanical stability, white-light illumination (e.g., lamps or LEDs) to eliminate speckle and improve resolution, and single-frame acquisition for high throughput.

SUMMARY OF THE DISCLOSURE

According to various examples disclosed herein, systems and devices provide for microscopic analysis of a sample by simultaneously characterizing infrared (IR) absorption characteristics through the photothermal effect (referred to herein as "Photothermal-Infrared" (PI) microscopy), and performing quantitative, instantaneous measurement of Optical-Path Length (OPL) differences. These systems and devices include a phase-difference imaging sensor for widefield imaging that measures the spatially resolved difference in phase between two illumination fields. These fields originate from a common illumination source, such as a laser, lamp, light-emitting diode (LED), or similar emitter, and are known as the "test" and "reference" fields. While these two fields are in-phase prior to illuminating the sample, they accumulate a phase-offset due to differences in the OPL caused by the thickness and refractive index of the sample. Critically, the test and reference fields have OPL differences below the temporal coherence length of the illumination source to allow wave interference. Moreover, the fields have opposite-handed circular-polarization states prior to interfering at the image plane with the phase-difference imaging sensor.

The analysis system implements a pixelated phase mask (PPM) in optical alignment with corresponding pixels of the phase-difference imaging sensor. The PPMs are composed of a plurality of linear polarizers (e.g., wire-grid polarizers), which only allow components of the interfering test and reference fields with a polarization oriented in the direction of the polarizer to transmit through the polarizer for subsequent detection. These polarizers also impart a phase shift of "+α" to the left-handed field and "−α" to the right-handed field when the polarizer is orientated at an angle "α" relative to the x-axis (for a total shift of 2α). Thus, if a phase mask is composed of an array of four linear polarizer elements having their transmission axes at 0°, 45°, 90°, and 135°, the mask will produce an array of four interferograms phase-shifted by 0°, 90°, 180°, and 270°, respectively (i.e., by increments of π/2 radians). The polarizer orientations in the PPM are interlaced to inhibit or prevent adjacent pixels from having the same orientation, referred-to herein as "forming super-pixels." From a single image, four full-field interferograms are captured and used to calculate phase differences in the OPL.

The PPM can be constructed using several techniques that combine standard photolithography and thin-film polarizer manufacturing techniques. In some examples, the PPM is constructed of arrays of thin, conductive-metal strips that are patterned and oriented on one side of a planar substrate. The resulting wide-grid polarizer provides polarization-specific transmission and reflection. Other examples make use of ellipsoid nanoparticles embedded in an optical substrate. The PPM may also be constructed from nanostructures to form metasurfaces on one side of a planar substrate. For use with linearly polarized reference and test fields, the PPM further includes quarter-wave retardation plates, preferably of the "zero-order" type, bonded to the front side of the PPM. Additionally or alternatively, the PPM can be used directly with orthogonal circular polarizations for the reference and test fields.

During operation, thermally induced changes to the OPL are measured via widefield PI microscopy. The PI signal originates from a nonradiative relaxation process after exciting IR-active molecules with permanent dipole moments through a direct dipole-allowed transition from the ground state to an excited vibrational state through the absorption of a resonant IR photon. The absorbed energy stimulates nuclear motion that is then dispersed through phonons to the surrounding environment, causing a local temperature increase by about 2 Kelvin (K) to about 3 K, and a corresponding thermally induced change to the refractive index. This change to the sample's optophysical properties lasts about 1 microsecond (s) to about 5 s, and is detectable by various techniques, including optical microscopy (as described herein), photoacoustic-based measurements, and Atomic-Force Microscopy (AFM) based measurements. Despite the long-wavelength radiation used to resonantly excite vibrational motion, once the IR photon is absorbed and the relaxation occurs, the induced temperature gradient remains in the local milieu and can be probed at much higher resolution using a diffraction-limited visible probe source. In PI microscopy, an image is captured where the sample under interrogation is simultaneously illuminated by pulsed visible and MIR light sources (the "hot" frame), followed by an image where the MIR source is blocked (the "cold" frame). The desired output signal can then be extracted as the difference between these two images.

In some examples, the IR source illuminates the sample from an oblique angle. Other examples use counterpropagating illumination or collinear illumination geometries in coordination with the probe radiation. Furthermore, the IR illumination source can be used to excite molecular vibrations of endogenous molecules present within the sample. In other examples, the source is used to excite molecular vibrations of contrast agents such as isotope probes, labels, dyes, or molecular tags added to the sample for functional multiplexing and to help identify specific chemical species, much like fluorescent probes commonly used in fluorescence microscopy.

In further accordance with the techniques of this disclosure, the phase-difference imaging sensor and the PI-microscopy-contrast mechanism may be combined with a variety of interferometric-microscopy configurations. Any suitable configuration of an interferometer that produces orthogonally polarized reference and test fields may be combined with the phase-difference imaging sensors described herein to provide single-frame phase-difference measurements used for PI microscopy. In some examples, this includes a Linnik, Mach-Zehnder, or Twyman-Green-type interferometer, a Mirau or Michelson-type interferometric microscope, and/or phase-sensitive microscopes based on common-path interferometric methods such as Diffraction Phase Microscopy (DPM), Zernike phase-contrast, and Differential-Interference Contrast (DIC). The test and reference fields may be collected by an objective lens operating in "transmission" mode, or via epi-detection.

Other objects, features, and advantages of the invention will become apparent to those skilled in the art from a consideration of the following detailed description taken in conjunction with the accompanying drawings and claims.

BRIEF DESCRIPTION OF THE DRAWINGS

The disclosure can be more completely understood in consideration of the following detailed description of various embodiments of the disclosure, in connection with the accompanying drawings, in which.

Figure 1:
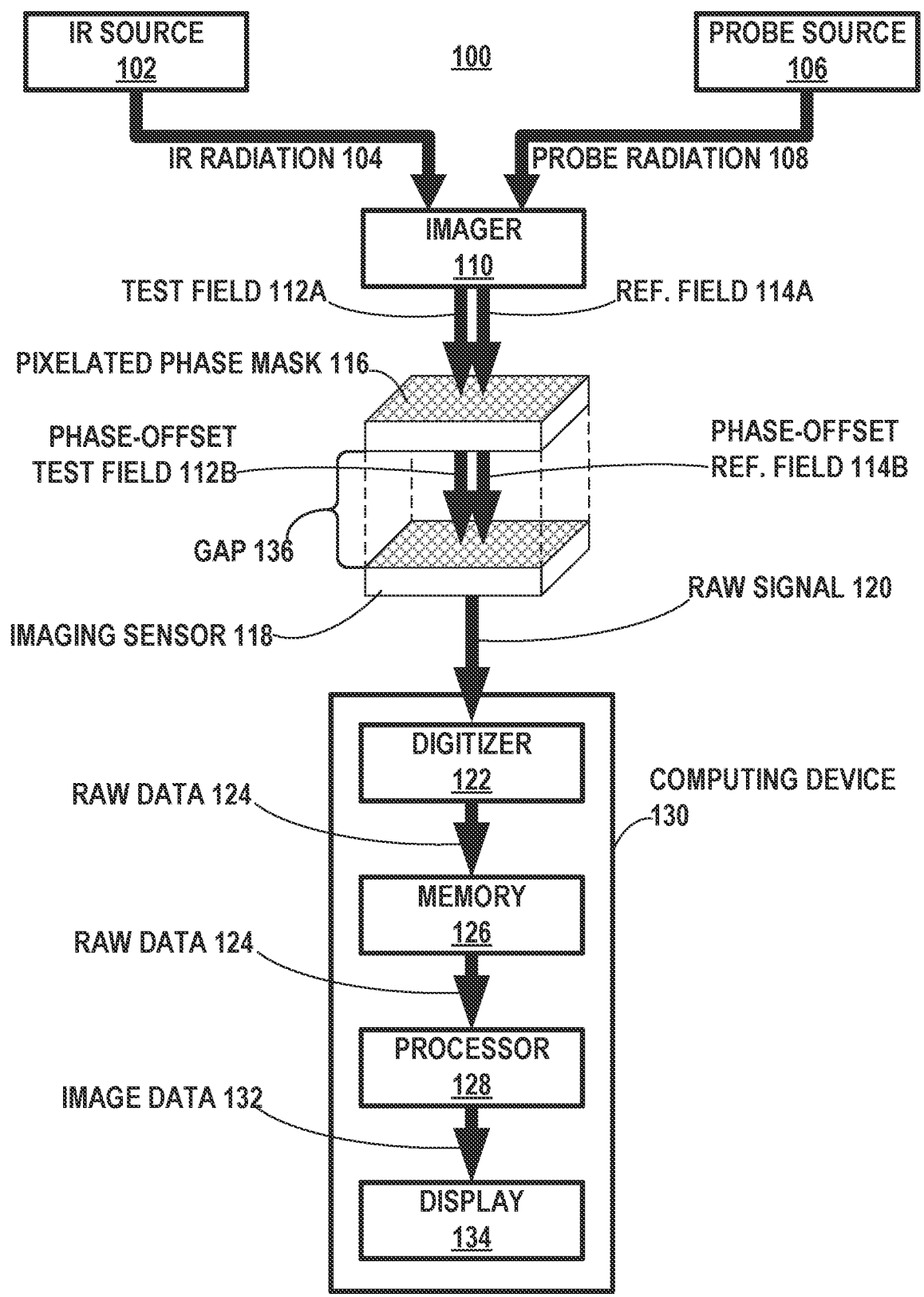
FIG. 1 is a conceptual diagram of an example sample-analysis system.

While examples of this disclosure are amenable to various modifications and alternative forms, specifics thereof shown by way of example in the drawings will be described in detail. It should be understood, however, that the intention is not to limit the disclosure to the particular examples described.

DETAILED DESCRIPTION

Infrared (IR) spectroscopy is a popular technique for analyzing and identifying molecular samples. When implemented in a microscope, IR spectroscopy techniques can be used to produce images with spectroscopic contrast, enabling label-free imaging of a wide range of samples of biological and economic interest. The most common type of IR microscope is a conventional Fourier-transform Infrared (FTIR) microscope, which covers spectroscopic absorption features over a broad spectral range in the Mid-Infrared (MIR) portion of the Electromagnetic (EM) spectrum. Despite the advantages of FTIR imaging, the technique nevertheless suffers from a number of practical hurdles, including (but not limited to): (1) significantly lower image resolutions compared to visible-light microscopy, (2) the inability to perform 3-D optical sectioning in thicker samples, (3) image distortion from thermal noise and/or relatively low pixel densities, and (4) significantly higher costs than other detectors, e.g., that operate in the visible-light, near-IR, and short-wave-IR bandwidths. Fortunately, recent developments have laid the foundation for a revolution in IR imaging. Photothermal-Infrared (PI) microscopy and Third-order Sum-Frequency Generation (TSFG) have broken the existing IR-diffraction limit and provide sub-micrometer (m) resolutions over the entire MIR range by encoding the long-wavelength-IR photons used to resonantly excite vibrational motion onto shorter-wavelength photons in the Ultraviolet (UV), visible, and near-IR regimes. Compared to linear IR-absorption microscopy, this new technique can improve spatial resolutions by a factor of ten or more, and enables "indirect" generation of IR images using a state-of-the-art Complementary Metal-Oxide-Semiconductor (CMOS) or Charge-Coupled Device (CCD) imaging sensors to detect the signal.

In PI microscopy, the desired imagery is generated by: (1) capturing a first image (the "hot" frame) using a standard visible-light microscope while the sample is illuminated by pulsed visible-spectrum and MIR-spectrum light sources; (2) capturing a second image (the "cold" frame) in which the MIR source is blocked; and (3) resolving the difference between the hot frame and the cold frame. This difference is a result of thermal lensing, i.e., a change in local refractive index and thermal expansion that lasts only a few microseconds (µs)—this is the photothermal signal. While the IR photons used to resonantly excite vibrational absorptions have longer wavelengths, the induced heating effect is much more localized and can be probed with visible-spectrum microscopes. PI microscopy can, in principle, be paired with any suitable widefield imaging method. However, some techniques are better than others.

In particular, phase-sensitive imaging techniques employ two interfering optical fields, which enables exceptional sensitivity to Optical-Path-Length (OPL) differences between the two fields. By sampling the field interferences at fixed intervals, the path-length difference can be quantified via any one of a class of techniques known as "Quantitative Phase Imaging" (QPI), to provide an absolute phase-shift value. QPI techniques are considered to be "label-free" microscopy methods in which interfering fields are deployed. QPI originated from earlier Phase-Shift Interferometry (PSI) techniques, and is now realized using other methods, including Diffraction Phase Microscopy (DPM), Zernike phase-contrast, Differential-Interference Contrast (DIC), ptychography, Intensity Diffraction Tomography (IDT), Transport of Intensity Equation (TIE), and Digital Holography (DH).

Phase shifting for quantitative interferometry can be accomplished by sequentially introducing a known phase step ("temporal phase shifting"), or by splitting the radiation fields into parallel channels using either multiple imaging sensors or one common sensor ("spatial phase shifting"). Spatial phase shifting provides certain advantages over temporal phase shifting, in that it is optimized for time-bandwidth product and can achieve data acquisition in a single-frame, enabling true video-rate (i.e., "real-time") imaging, and in doing so, mitigates the effects of external sources of noise, such as mechanical vibrations. On the other hand, spatial phase shifting can reduce spatial resolution (e.g., when using a common imaging sensor), or requires the added complexity of aligning and synchronizing multiple imaging sensors. However, in accordance with the techniques of this disclosure, a pixelated phase mask (PPM) can be used to simultaneously capture multiple interferograms to rapidly measure optical-path-length differences using a single imaging sensor, uniquely providing the advantages from both types of phase-shifting techniques.

While some exemplary modes of practicing these techniques are detailed below, it is to be understood that these examples are merely illustrative in nature, and the techniques of this disclosure are not inherently limited to these examples explicitly described. A person of ordinary skill in this field will readily appreciate that variations of the described techniques are likewise implementable, and do not meaningfully deviate from the basic concept of the present disclosure—any such "work around" similarly falls under the scope of this document. It is envisioned that other styles and configurations of the present disclosure can be easily incorporated into the teachings of the present disclosure, and only a limited number of particular configurations are shown and described for purposes of clarity and disclosure, but not for limitation of scope.

Specifically, the primary concept of this disclosure involves the integration of widefield photothermal microscopy with single-frame quantitative phase imaging, by using a pixelated phase mask (PPM) and a pixelated imaging sensor. Each set of phase-mask pixels with a common polarizer orientation provides a spatially separated intensity pattern ("interferogram") onto corresponding pixels of the imaging sensor. A minimum of three interferogram sets, each associated with a different phase shift, is sufficient to produce unambiguous, quantitative phase information using conventional interferometric algorithms. Notably, the clearest imagery can be produced by uniformly distributing the phase-mask pixels throughout the phase mask, such that each pixel is surrounded by adjacent pixels with different polarizer orientations.

According to the systems and methods described herein, high-contrast imagery can be generated through the photothermal mechanism while using a phase-difference imaging sensor. This allows for simultaneous or single-frame acquisition of multiple interferograms to extract spatially resolved phase information. Thus, various imaging configurations may be implemented to measure, in real-time, the optical phase difference between a "reference" field wavefront and a "test" field wavefront. Combining this detection approach with IR illumination allows for rapid quantitative analysis of chemically heterogeneous samples, producing imagery with spatial resolutions at the sub-micron scale.

Photothermal-infrared microscopy using a narrow-linewidth MIR light source enables high-resolution imaging with true chemical contrast based on vibrational spectroscopy. Vibrational spectroscopy is one of the strongest methods to characterize molecular composition, and comes in two flavors: Raman scattering, and IR-absorption. As compared to "spontaneous" Raman scattering microscopy, and the more recently developed "Coherent Raman Scattering" (CRS) microscopy modalities, IR-absorption benefits from cross-sections (e.g., $\sim 10^{-22}$ cm$^2$sr$^{-1}$) that are on the order of 100-million times larger than the corresponding Raman scattering cross-sections. This robust light-matter interaction allows IR-based methods to be deployed in a widefield geometry, which enables camera-based high-speed chemical imaging.

The PI signal originates from a nonradiative relaxation process after exciting a molecular vibration from the ground state through absorption of a resonant IR photon. The absorbed energy stimulates nuclear motion, which is then dispersed through phonons to the surrounding environment, causing a localized temperature increase and corresponding change in refractive index and thermal expansion. This change in physical and optophysical properties of the sample is detectable by various techniques, including optical microscopy (as described herein), photoacoustic measurements, and Atomic-Force Microscopy (AFM) based measurements.

Photothermal-infrared microscopy is further enhanced by using imaging sensors with sensitivities in the visible and near-infrared spectra, which provide for higher quantum yields, faster acquisition rates, and significantly higher pixel densities (e.g., ~10 megapixels (MP) or more). PT microscopy can be deployed in a widefield geometry that is much faster (e.g., "video" rate) than point-scanning implementations (e.g., about 1 frame/second, 512×512-pixel frames) or sample-stage-scanning implementations (e.g., about 1 frame/minute, 512×512-pixel frames). Depending on the magnification of the optical components and the size of the imaging sensor used in the setup, a field-of-view of about 300×300 m² or more is readily achievable while maintaining sub-micron resolution.

Generally, intensity-based PI modalities have limited sensitivity due to shot-noise present in the probe source. They can also suffer from a large-static, low-spatial-frequency background, which limits the optical system's sensitivity to thermal perturbations in the optical wavefront. Provided that the transient photothermal effect increases the temperature by a just few degrees Kelvin, the corresponding change to the refractive index, e.g., for biological specimens, is approximately $10^{-4}$ per degree. As an illustrative example, assuming the sample has a refractive index of 1.38 (comparable to that of water, at about 1.33), then such a minor change in refractive index typically requires numerous frame averages to reach an appreciable signal-to-noise ratio (SNR). One example method to optimize the detection path for improved contrast and SNR includes deploying pupil engineering for dark-field imaging. As described by Cheng et al. in International Patent Application Publication No. WO2022/204525A1, the entire contents of which are hereby incorporated by reference, this approach that can boost the SNR six-fold.

Another method is to change the optical setup to be sensitive to optical phase ("phase contrast") rather than intensity, as described in "Molecular contrast on phase-contrast microscope," by K. Toda, M. Tamamitsu, Y. Nagashima, et al., the contents of which are hereby incorporated by reference. Phase-sensitive methods provide contrast to otherwise largely transparent samples through wave interference, i.e., without requiring the use of stains or dyes. Quantitative phase-based measurements can be conducted with exceptional sensitivity, e.g., routinely achieving nanometer-scale path-length stability while maintaining diffraction-limited lateral resolution. Combining the sensitivity of QPI with the chemical specificity of PI microscopy is potentially transformative.

Despite using the long wavelength to resonantly excite vibrational motion in IR-absorption spectroscopy (and thereby, in photothermal-infrared microscopy), after the IR photon is absorbed and the relaxation occurs, the induced temperature gradient remains within the local environment and can be probed at much higher resolution using a diffraction-limited visible-spectrum (or even UV-spectrum) probe source. Care must be taken when choosing a probe source, however, as to avoid electronic absorptions that can also heat the sample through phonon-mediated relaxations. In certain models of the PI effect, the nanoscale absorbing molecules are treated as point-like sources of heat in a thermal-transfer medium having a fixed thermal conductivity. The induced thermal gradient is transient, lasting only a few microseconds (s) in typical thin samples. The photothermal effect can be induced by a compact and cost-effective pulsed Quantum Cascade Laser (QCL), although newer sources, currently under development, including tunable, narrowband MIR light sources based on single-step parametric down conversion may also be used. These sources are narrowband (i.e., bandwidth<10 $cm^{-1}$, and preferably <5 $cm^{-1}$) in order to discretely target individual spectral features that often have full-width-half-max (FWHM) bandwidths (around 10-to-15 $cm^{-1}$), although some vibrational modes, such as the hydroxyl stretching mode, can be on the order of 100 $cm^{-1}$. The pulsed light sources typically operate at a pulse-repetition rate between about 0.1 kilohertz (kHz) and about 1 megahertz (MHz), and have pulse durations from about 0.1 nanosecond (ns) to about 100 ns. Advantageously, such IR-illumination sources are tunable across at least a portion of the mid-infrared spectral range (i.e., wavelengths of about 2.5 μm to about 10 μm, or wavenumbers of about 1000 $cm^{-1}$ to about 4000 $cm^{-1}$) and are available by commercial suppliers including: Thorlabs, Inc., of Newton, New Jersey; Block Engineering, of Southborough, Massachusetts; and DRS Daylight Solutions, of San Diego, California.

Experimental setups typically deploy "oblique" illumination, in which the MIR radiation is loosely focused onto the sample from one lateral side. Specifically, the radiation is focused onto an area of the sample that is roughly 1.5× the Field-of-View (FOV) to provide uniform PI contrast and to reduce the vignetting effect (i.e., a significantly lowered contrast around the periphery of the FOV compared to the center). The use of oblique illumination counteracts the practical limitation that commercial refractive objective lenses do not transmit visible and MIR light. Conversely, reflective objective lenses, such as the Hanninen-type objective lens and commercially available Schwarzschild-Cassegrain lenses, can easily accommodate radiation over a broad spectral range (e.g., from UV to MIR), allowing for collinear illumination geometries.

The photothermal signal is probed using pulsed probe radiation at wavelengths shorter than the MIR-source wavelength, for instance, microscopy-grade-LED sources. These spectrally broad (i.e., "white") light sources (including LEDs) have FWHM spectral bandwidths of about 10 nanometers (nm) to about 50 nm. These bandwidths lead to short coherence lengths which advantageously reduces or eliminates "speckle" noise, as well as background interferences in the interferograms caused by stray reflections off of non-sample surfaces within the optical path. Given that the transient photothermal response lasts only a few microseconds (μs), preferred probe sources have a "rise" time up to their peak intensity of less than about 5 s, and a similarly short "fall" time. Advantageously, such sources require only modest optical powers (e.g., less than about 5 milliwatts (mW) for typical "thin" samples) given the near-unity quantum efficiencies of modern back-illuminated imaging-sensor arrays. Such probe sources are commercially available from optical suppliers including Thorlabs, Inc., of Newton, New Jersey, and Edmund Optics, of Barrington, New Jersey.

Turning now to the drawings, wherein like parts are designated throughout with like numerals and symbols, FIG. 1 is a simplified conceptual diagram of an example sample-analysis system 100, in accordance with the techniques of this disclosure. As shown in FIG. 1, system 100 includes at least: an infrared (IR) illumination source 102 configured to emit IR radiation 104; a "probe" illumination source 106 configured to emit probe radiation 108; and an imager or microscope 110 holding a sample to be analyzed. As detailed further below, imager 110 is configured to use probe radiation 108 to generate a "test" field wavefront 112A and a "reference" field wavefront 114A. Specifically, imager 110 generates the two field wavefronts 112A, 114A to have mutually orthogonal polarization states (either linear or circular) prior to reaching a pixelated phase mask (PPM) 116.

For each pixel of the probe radiation beam 108, PPM 116 introduces an effective phase delay between the test field 112A and the reference field 114A to produce mutually-interfering test field 112B and reference field 114B. Mutually-interfering test field 112B and reference field 114B propagate forward onto a pixelated imaging-sensor array 118 (hereinafter, "imaging sensor 118").

Imaging sensor 118 is configured to detect phase-offset test and reference fields 112B, 114B. For each detected "pixel" of the test and reference fields 112B, 114B, imaging sensor 118 is configured to generate and output a corresponding electrical signal 120, having a charge amplitude that is directly proportional to the optical intensity of the respective pixel. Imaging sensor 118 outputs electrical signal(s) 120 to a digitizer module 122. Digitizer module 122 is configured to convert electrical signal(s) 120 into corresponding bits of data 124 indicative of the amplitude of electrical signal 120. Digitizer module 122 is further configured to encode data 124 into a computer-readable medium 126 (hereinafter, "memory 126"), such as a Random-Access Memory (RAM) or Read-Only Memory (ROM). Processing circuitry (or "processor") 128 of a computing device 130 is configured to retrieve data 124 from memory 126, and process data 124 in order to generate image data 132, e.g., in the form of chemical imagery and/or infrared-absorption-spectra imagery. Processor 128 transmits the image data 132 to a visual display 134 (e.g., a computer display screen) or other suitable output device for viewing by a user. In some examples (but not all examples), digitizer 122, memory 126, and/or display 134 are integral components of the same computing device 130 as processor 128, such as a common personal computer (PC), laptop, smartphone, server, or the like.

In preferred examples, PPM 116 defines an effective pixel pitch that is identical to the pixel pitch of imaging sensor 118, so that the effective pixels are substantially coincident across the entire surface of each component. The PPM 116 and the imaging sensor 118 may be substantially located at a common image plane or positioned in conjugate image planes. For the purposes of this disclosure, "substantially located at a common image plane" is satisfied when the respective image planes are mutually separated by a gap 136 that is shorter than the depth of image focus. Imaging sensor 118 includes a pixel array that preferably defines a several-megapixel resolution. Imaging sensor 118 also preferably operates at-or-above a standard "video" framerate, i.e., at-or-above about 30 frames per second, with a 10-to-16-bit registration. PPM 116 can be directly bonded to imaging sensor 118, or mechanically registered and separated by a small gap 136.

Imager 110 can be configured with any suitable illumination-and-collection geometry (i.e., physical arrangement of sub-components). For instance, FIGS. 2A-2E illustrate five non-limiting example configurations 200A-200E, respectively, of the microscope/imager 110 of sample-analysis system 100 of FIG. 1.

Figure 2B:
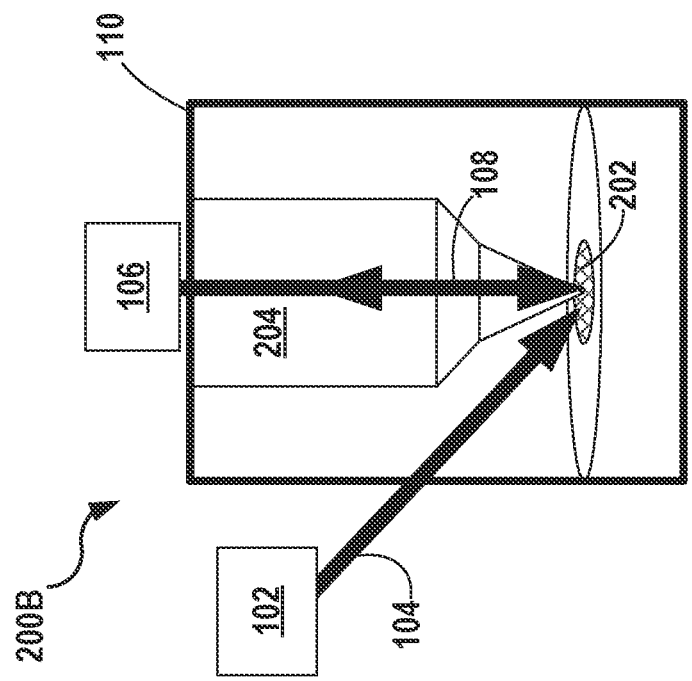
FIGS. 2A-2E are schematic diagrams of five example configurations of the microscope/imager of the measurement system of FIG. 1.
Figure 2A:
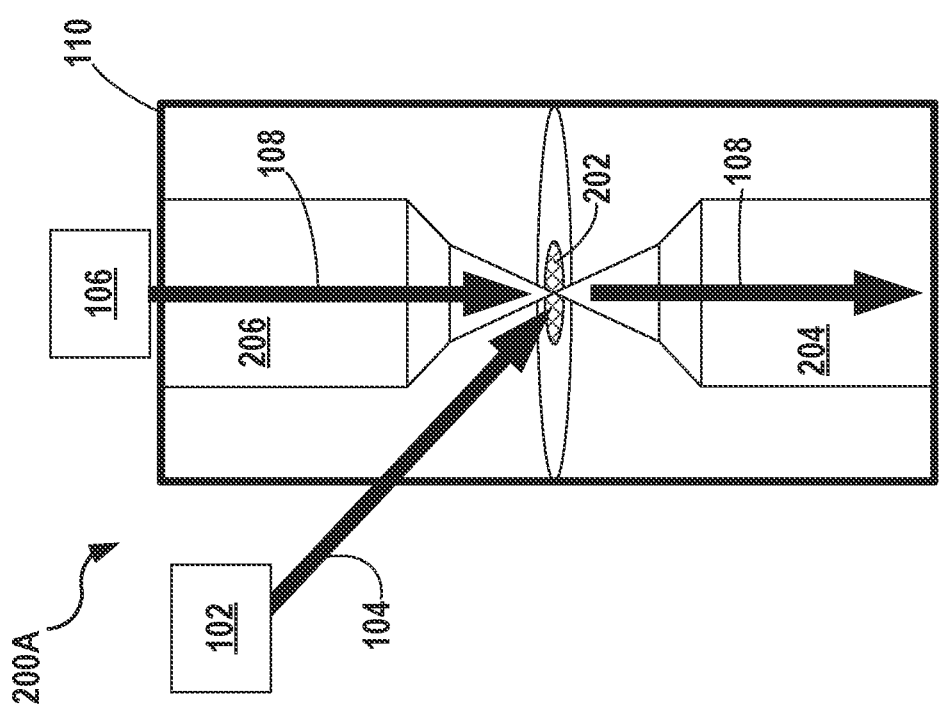

The first example imager configuration 200A shown in FIG. 2A pairs oblique infrared illumination 104 with transmission detection. That is, IR source 102 is configured to loosely focus IR radiation beam 104 onto the sample 202 at an oblique angle, as described above. Probe source 106 emits visible-spectrum probe radiation 108 through illuminating lens 206 (or "condenser 206"), through the sample 202, and through high-quality objective lens 204. With oblique-IR-illumination setups, care must be taken to avoid clipping the housing of the objective lens 204 or the condenser 206 with IR source 102.

The second example imager configuration 200B shown in FIG. 2B pairs oblique infrared illumination 104 with epi-detection. That is, IR source 102 is configured to loosely focus IR radiation beam 104 onto the sample 202 at an oblique angle, as described above. However, unlike in FIG. 2A, in FIG. 2B, imager 110 does not have a condenser lens 206, because high-quality objective lens 204 is used to both illuminate sample 202 with visible-spectrum probe radiation 108, and to re-collect the light 108 reflected off of sample 202.

Figure 2D:
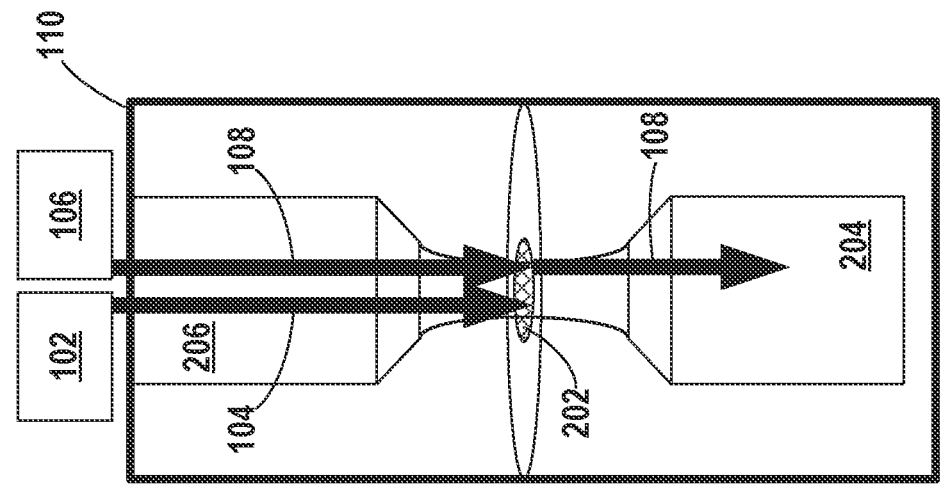
Figure 2C:
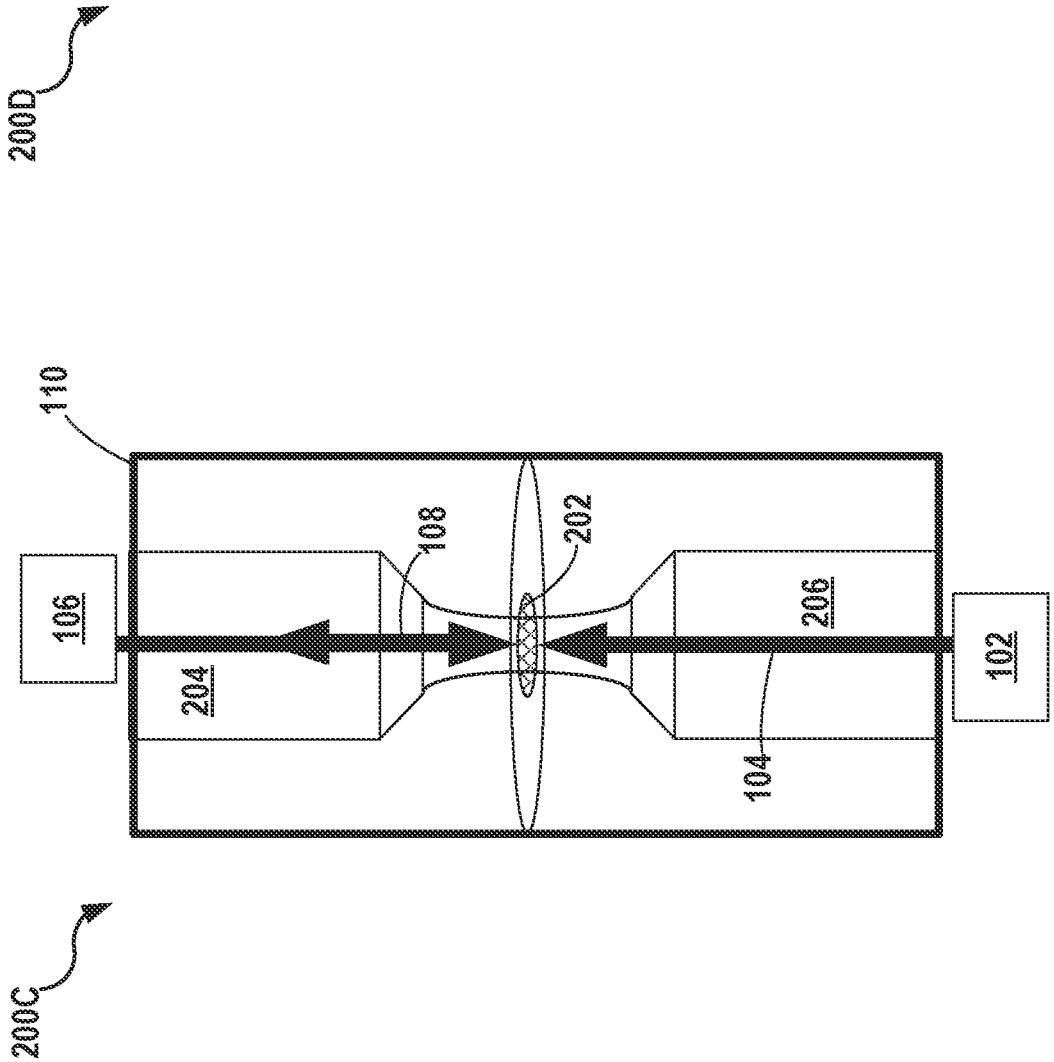

The third example imager configuration 200C shown in FIG. 2C incorporates a "counterpropagating" illumination geometry, in which IR beam 104 and visible-spectrum probe beam 108 are aimed at sample 202 from opposite directions. IR beam 104 passes from condenser 206 and onto sample 202. Meanwhile, visible probe light 108 passes through objective lens 204, and reflects off of sample 202 back into objective lens 204. This counterpropagating setup is particularly advantageous when imaging a relatively thin sample 202 that allows a sufficient amount of IR beam 104 to reach sample 202. Additionally, the counterpropagating illumination geometry compensates for the inability of commercially available refractive objective lenses 204 to transmit MIR light 104 and visible-spectrum probe radiation 108 simultaneously.

The fourth example imager configuration 200D shown in FIG. 2D pairs collinear illumination, in which IR beam 104 and visible-light probe beam 108 are aimed at sample 202 from the same direction, with transmission detection. That is, both IR beam 104 and visible-light probe beam 108 pass through condenser 206 and onto sample 202, and probe beam 108 passes into objective lens 204 for subsequent detection by imaging sensor 118 (FIG. 1). This configuration is useful for a relatively thin sample 202 as a thicker sample may absorb and/or scatter too much of the light to be detected.

Figure 2E:
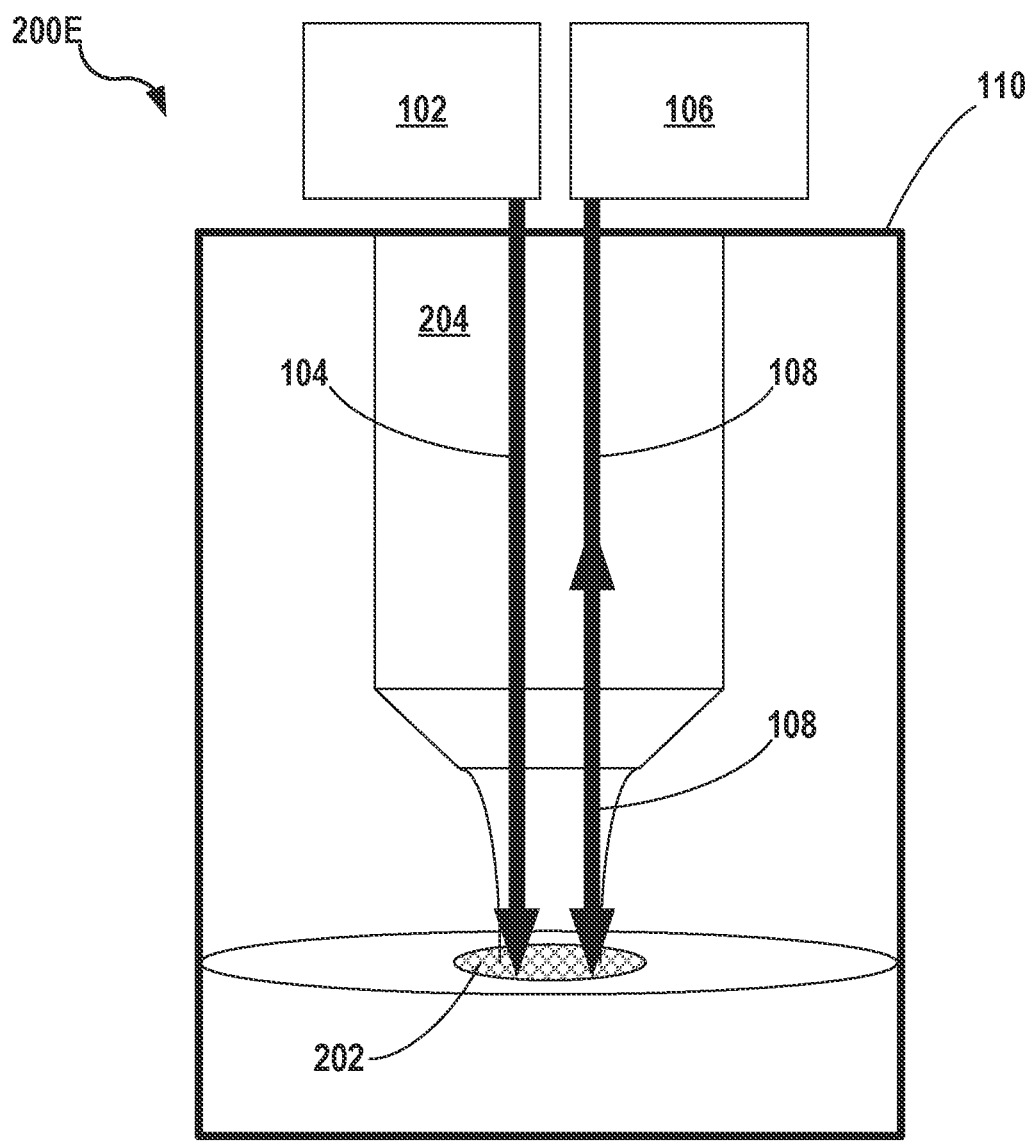

The fifth example imager configuration 200E shown in FIG. 2E, pairs collinear illumination with epi-detection. Specifically, IR beam 104 and visible probe beam 108 are both transmitted through objective lens 204 and onto sample 202, and probe beam 108 is collected by objective lens 204 for subsequent detection by imaging sensor 118 (FIG. 1). In many cases, this configuration is preferred, as it can accommodate a relatively thick sample 202. Accommodating the broad spectral range of collinear illumination likely requires the use of a reflective objective lens 204, which is inherently broadband, although certain refractive and catadioptric objectives may also be used when specifically designed for a broad spectral range. Collinear illumination allows for the use of high-Numerical-Aperture (NA) lenses, including immersion-type lenses, in illumination and collection, which significantly improves spatial resolution. Conversely, the larger Field-Of-View (FOV) associated with low-NA lenses may be preferable for certain configurations.

Figure 3:
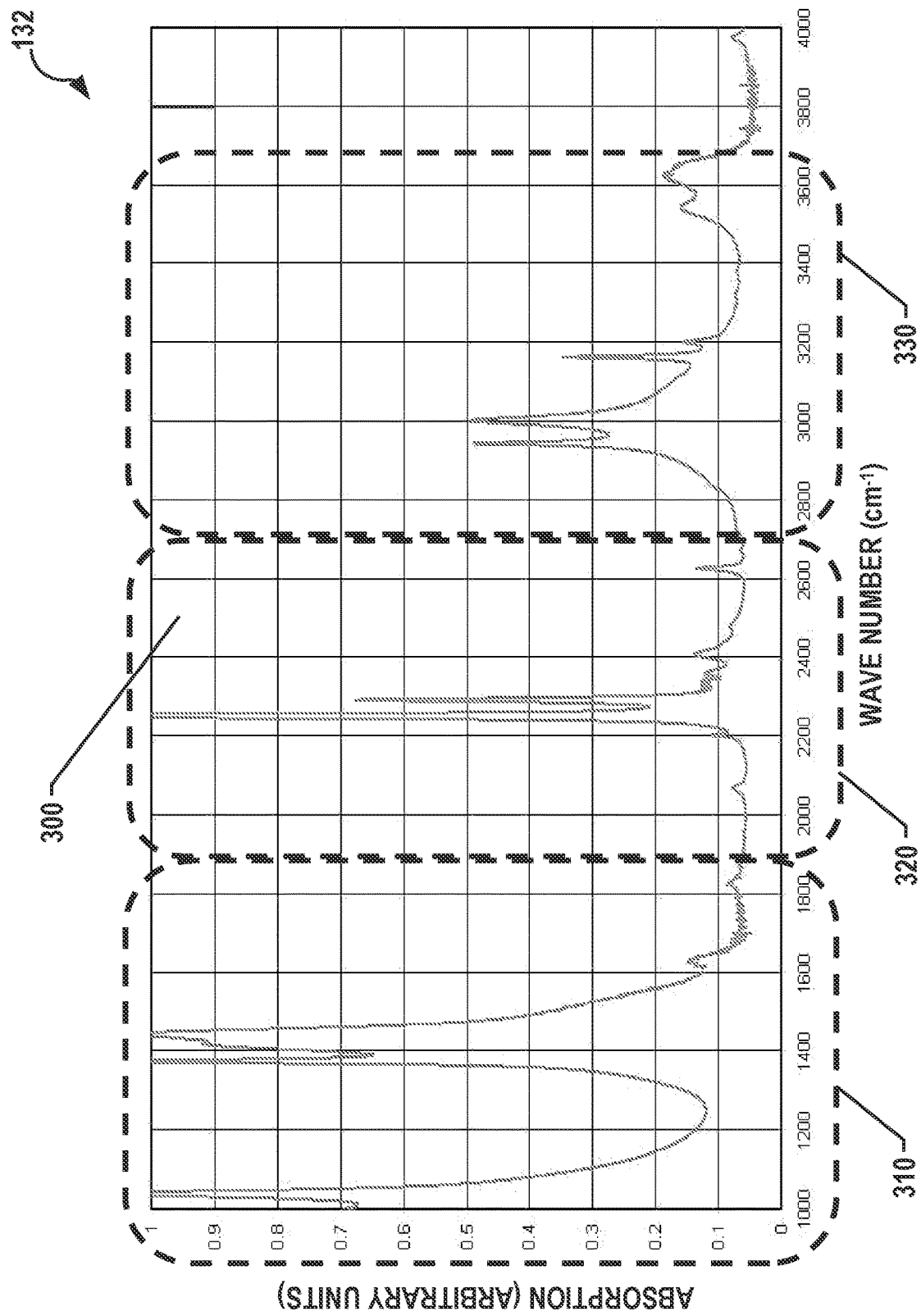
FIG. 3 is an illustrative, non-limiting example of image data that may be generated and displayed by the system of FIG. 1, in the form of a line graph of representative absorption features across the Mid-Infrared ("MIR") spectral range.

FIG. 3 shows a line graph—one non-limiting, illustrative example of image data 132 that may be generated and displayed by sample-analysis system 100 of FIG. 1—depicting representative absorption features across the Mid-Infrared ("MIR") spectral range. Specifically, FIG. 3 depicts an IR-absorption spectrum 300 from a deuterated organic solution that exemplifies the spectral features that can be addressed in a spatially resolved, high-throughput manner. The spectral graph 300 distinguishes between three regions: (1) the "fingerprint" region 310, (2) the "cell silent" region 320, and (3) the "high-frequency fingerprint" region 330. For typical unlabeled biological specimens, regions 310 and 330 are likely to provide the most-useful IR-absorption features, whereas exogeneous IR probes are likely to produce distinct absorption features within region 320. Beside isotope labeled compounds, other IR molecular probes with resonant vibrational modes present in the silent region 320 include, but are not limited to: alkynes, nitriles, isonitriles, cyanates, isocyanates, thiocyanates, and isothiocyanates.

Figure 4A:
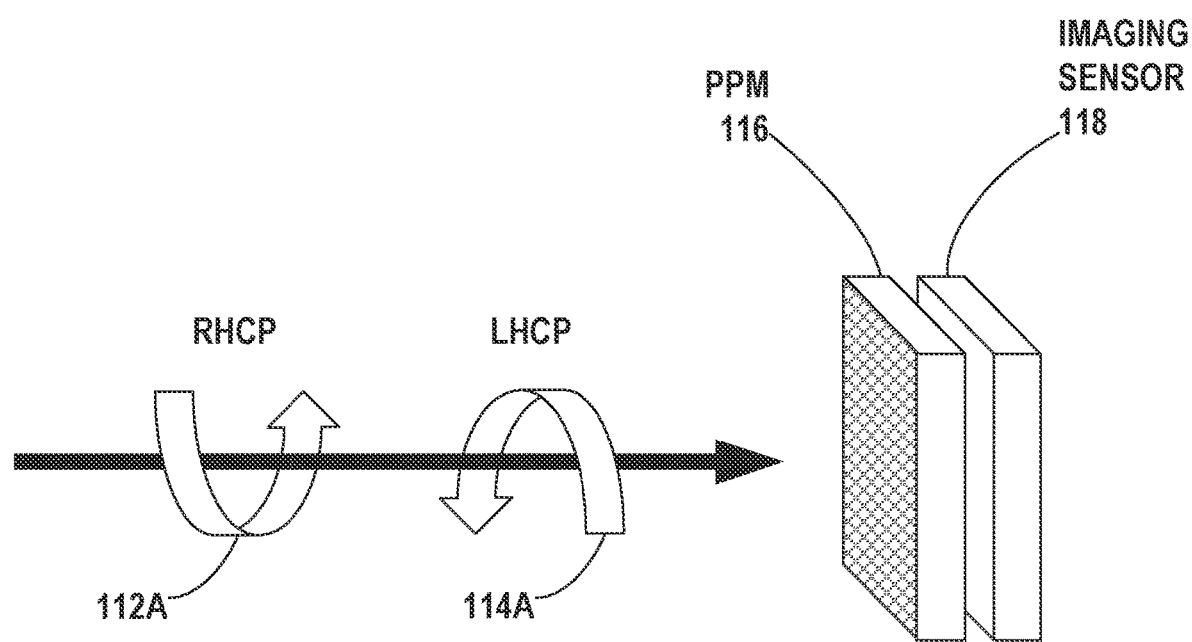
FIG. 4A is a conceptual diagram of an example pixelated phase mask ("PPM") of the system of FIG. 1, suitable for processing reference and test beams with orthogonal circular polarization.
Figure 4B:
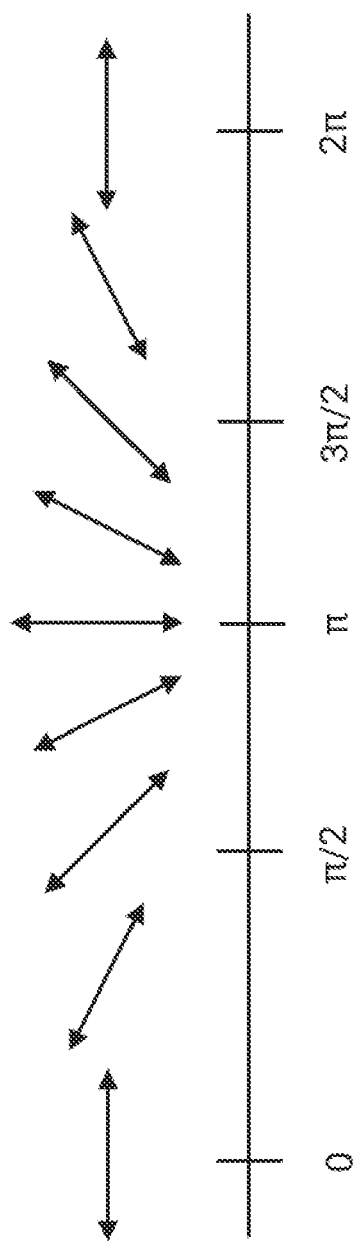
FIG. 4B is a conceptual diagram of the resulting interference relationships at nine example phase shifts.
Figure 4B:
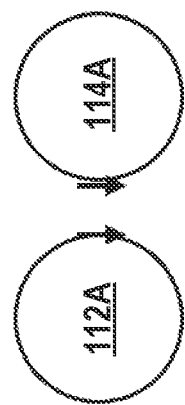

Similar to imager 110 (as described above with respect to FIGS. 2A-2E), pixelated phase mask 116 of FIG. 1 can also include various alternative and aggregate features, arrangements, and configurations. For instance, FIG. 4A illustrates an example in which the input polarization of the test field 112A is right-hand circular, and the input polarization of the reference field 114A is left-hand circular. In such instances, the PPM 116 can be constructed from an array of oriented polarizers. The intensity of two radiation beams having orthogonal circular polarization that are interfered by a polarizer is given by:

$$I(x,y) = \tfrac{1}{2}(I_t + I_r + 2(I_t I_r)^{0.5} \cos(\delta\phi(x,y) + 2\alpha_p)) \quad (1)$$

where $\alpha_p$ is the angle of the polarizer with respect to the x-y plane, and $\delta\phi(x, y)$ is the phase difference between the two wavefronts induced by the sample 202. This relationship shows that a polarizer orientated at 0° causes interference between the in-phase components of the incident test field 112A and reference field 114A. Conversely, a polarizer oriented at 90° interferes the out-of-phase component between the incident fields 112A, 114A. The resultant phase sampling is illustrated in FIG. 4B. If the incident test and reference fields 112A, 114A are orthogonal linearly polarized, they can be converted to opposite-handed circular polarization states (as depicted in FIG. 4A) using a Quarter-Waveplate (QWP). For convenience, the QWP can be physically coupled to the PPM 116. In other examples, they can be separated by a substantial distance, or even positioned on opposite sides of other imaging optical components.

Figure 4C:
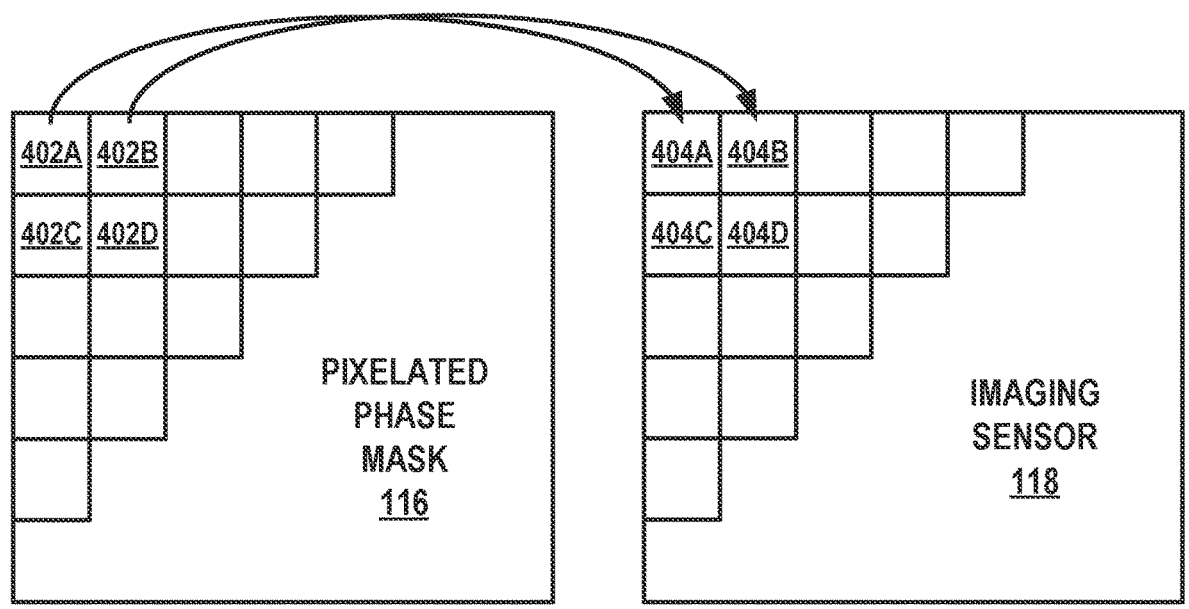
FIG. 4C is an example of the PPM of FIGS. 1 and 4A, illustrating a possible orientation of the polarization elements, and a graphical representation of how the PPM pixels correspond to counterpart pixels on the sensor.
Figure 4C:
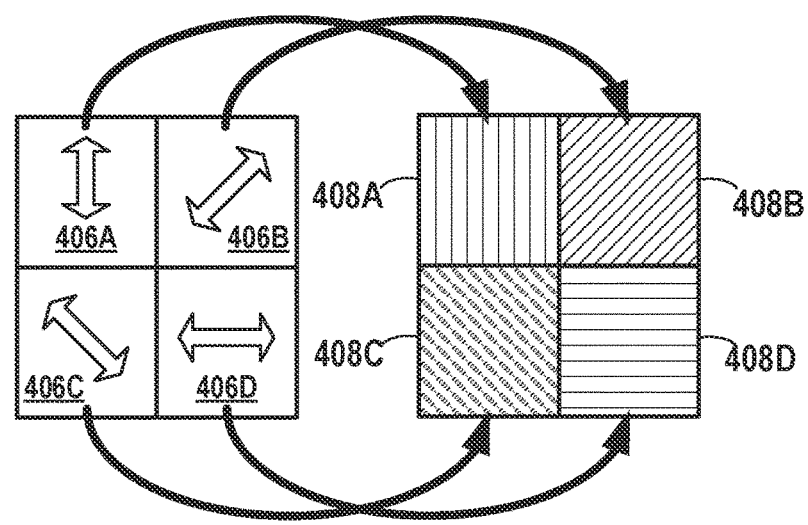

FIG. 4C is a conceptual diagram of a preferred example of pixelated phase mask (PPM) 116, in which each pixel 402A-402D of the PPM 116 corresponds to a counterpart pixel 404A-404D, respectively, of the imaging sensor 118 (e.g., pixel 402A of PPM 116 corresponds to counterpart pixel 404A of imaging sensor 118, etc.). While the effective "pitch" of each pixel 402A-402D of PPM 116 can have any suitable spatial distribution, it is preferred to define a regularly repeating pattern. In one such patterned distribution, adjacent pixels are said to be "in quadrature," i.e., are mutually out-of-phase by either 90° or 180°. Another example pitch distribution can be derived by phase-sampling at three equally spaced values arranged at 1200 phase shifts between adjacent pixels.

Figure 4D:
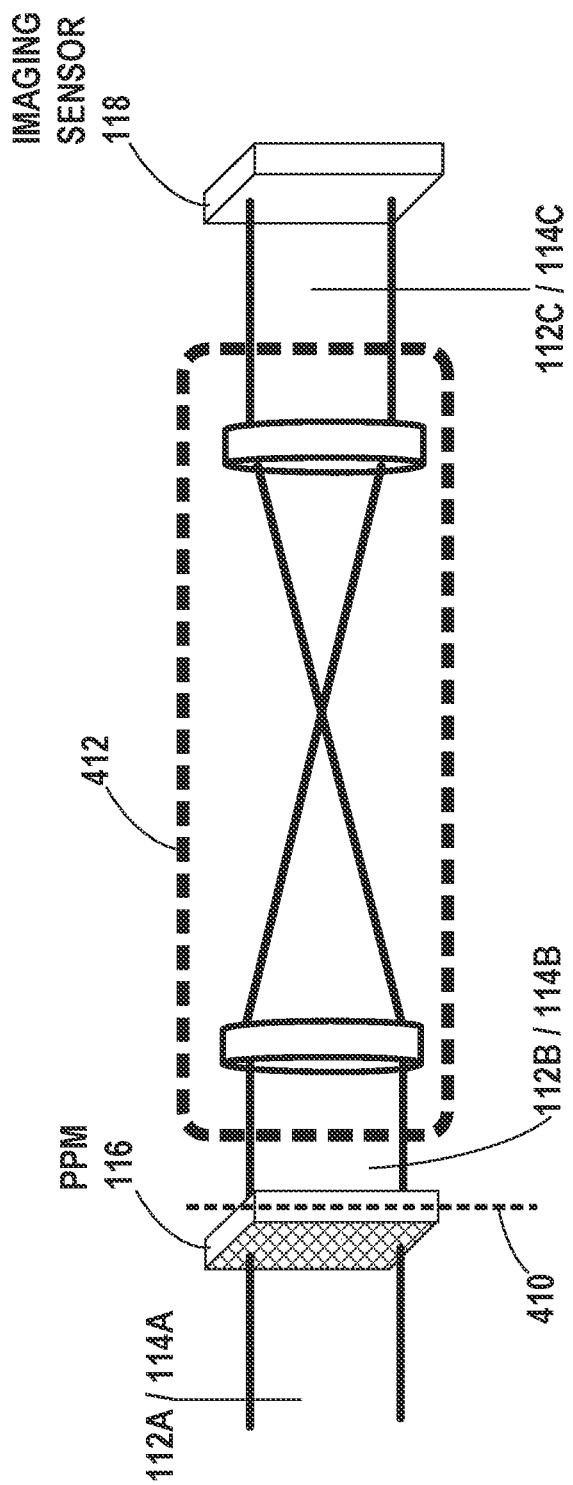
FIG. 4D is a conceptual diagram of an example of the system of FIG. 1 that incorporates relay optics between the pixelated phase mask and the imaging sensor.

FIG. 4C further illustrates another example arrangement of PPM pixels 406A-406D and corresponding imaging-sensor pixels 408A-408D, using a four-interferogram technique. Each interferogram of PPM 116 is composed of several-thousand to several-million pixels sharing a common polarizer orientation. Computing device 130 (FIG. 1) can use a variety of well-known algorithms to calculate the phase difference from the interferogram data. For example, a possible implementation for extracting phase information is the four-bucket algorithm:

$$\delta\phi(x,y) = \tan^{-1}[(C(x,y) - A(x,y) / D(x,y) - B(x,y)] \quad (2)$$

where the values A, B, C, and D are taken from adjacent pixels with polarizer orientations rotated by 45° intervals. That is, "A" is oriented at 0° (e.g., 408D), "B" is oriented at 450 (e.g., 408B), "C" is oriented at 90° (e.g., 408A), and "D" is oriented at 135° (e.g., 408C). Another example is illustrated in FIG. 4D, in which PPM 116 is positioned at the input pupil plane 410, and intermediate relay optics 412 are used to further modify the light 112B/114B that is transmitted outward from the PPM 116, into re-imaged light 112C/114C that subsequently strikes the imaging-sensor array 118. One example practical application for this configuration is to re-scale the pixel pitch of PPM 116 to match that of the imaging sensor 118 (typically around m) by introducing de/magnification via the relay optics 412. Accordingly, this pixel de/magnification compensates for arrangements in which the two sets of pixel pitches are not physically identical.

Figure 5:
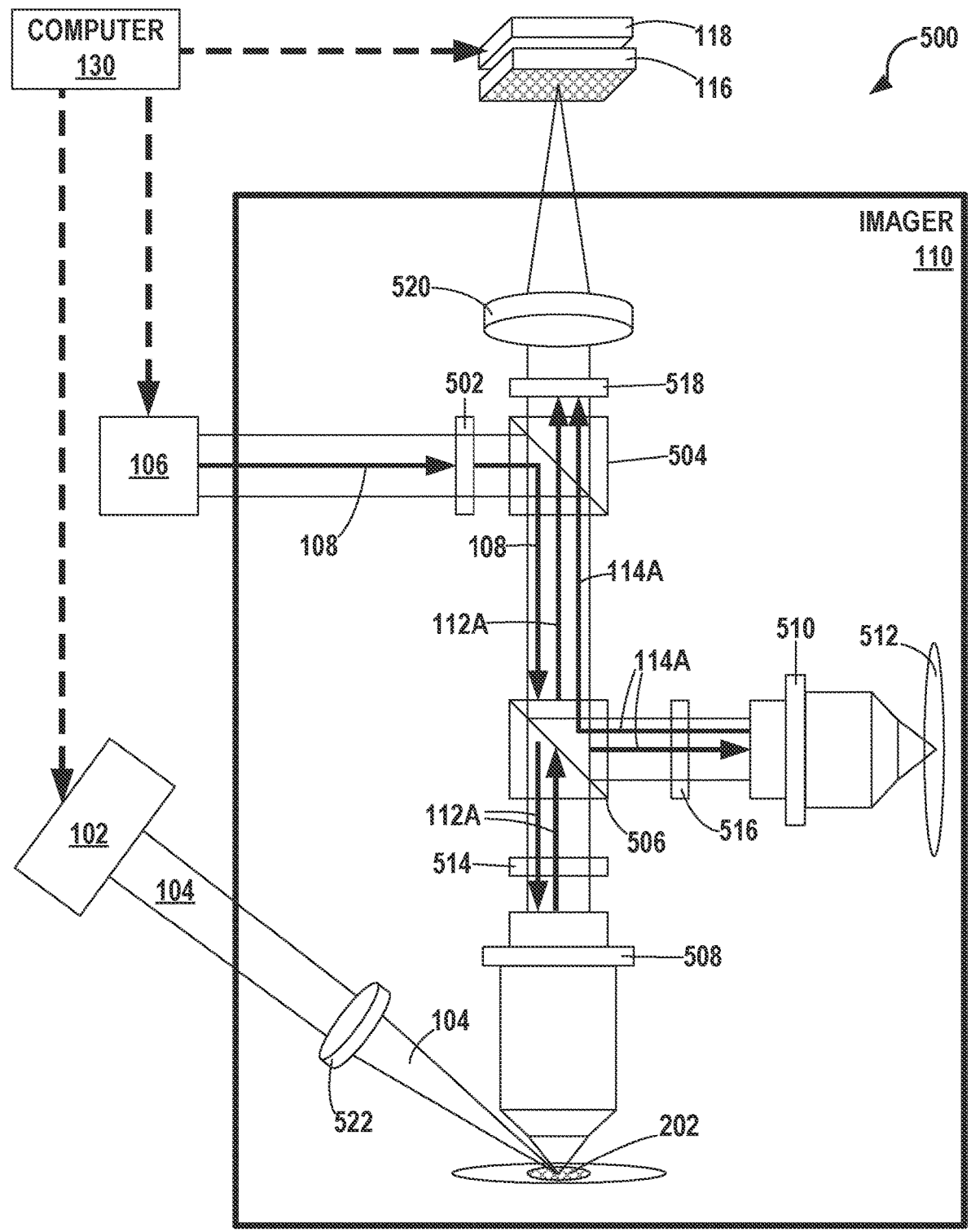
FIG. 5 is a conceptual diagram of an example of the system of FIG. 1 in which oblique IR illumination and the PPM are combined with a Linnik-type polarization interferometer.

FIG. 5 is a conceptual diagram of a sample-analysis system 500, which is an example of system 100 of FIG. 1, apart from any differences explicitly noted herein. In particular, system 500 of FIG. 5 represents an example of system 100 wherein the imager 110 is arranged in a Linnik-type interferometer configuration.

The probe illumination source 106 produces probe radiation 108 having a wavelength shorter than that of the IR illumination 104 to achieve superior optical resolution through the photothermal effect. Specifically, the probe source 106 can be selected to emit probe radiation 108 having a wavelength that is: (1) within the ultraviolet (UV) spectrum, to achieve very-high resolution; (2) within the visible spectrum, to benefit from the high quantum efficiencies of a silicon CMOS-camera imaging detector 118; or (3) within the near-infrared spectrum or short-wave-infrared spectrum, to benefit from reduced scattering in otherwise opaque, highly scattering samples 202, such as thick-tissue specimens.

The probe radiation 108 is conditioned using a linear polarizer 502 established at a near-45° angle within the plane orthogonal to the direction of propagation. The radiation passes through a non-polarizing beam splitter 504 and is separated by a polarizing beam splitter 506 to produce the test and reference fields 112A, 114A that have orthogonal polarization states.

Identical objective lenses 508, 510 (e.g., objective lens 204 of FIGS. 2A-2E) are used in epi-detection to collect the reflected test and reference fields 112A, 114A off the surface of the sample 202 and the reference mirror 512, respectively. The reference mirror 512 is placed at the focal plane of the objective lens 510 so as to match the Optical Path Length (OPL) of the test field 112A. Quarter-waveplates 514 and 516 are used to rotate the polarizations of the test and reference fields 112A, 114A after reflection while maintaining their mutually orthogonal linear polarization states, so they may be recombined by the polarizing beam splitter 506 and propagate toward the imaging sensor 118.

The two fields 112A, 114A pass through the non-polarizing beam splitter 504 and through another quarter-waveplate 518 to produce opposite-handed circular polarization states (e.g., as depicted in FIG. 4A). As one skilled in the art would readily understand, the particular arrangement of waveplates and polarizing optical components depicted in FIG. 5 is merely one of virtually limitless alternative arrangements of similar components to produce orthogonally polarized fields 112A, 114A. The fields 112A, 114A are finally imaged after passing through a tube lens 520 and through PPM 116, and onto the pixelated imaging sensor 118. Contrast between two interfering fields 112B, 114B is maximized when the fields are equal in intensity accordingly, the linear polarizer 502 can be rotated as-needed to balance the intensities of the two fields.

Proximate the imager 110 in the Linnik-type geometry is the mid-infrared illumination source 102 and a reflective or refractive focusing element 522, which loosely focuses IR beam 104 onto the sample 202. In some examples, a computing device 130 is configured to synchronize the IR source 102 and the probe source 106 for contemporaneous illumination onto sample 202 to capture the transient thermal effect. Additionally or alternatively, the computer 130 can synchronize the pulsed illumination sources 102, 106 with the frame-capture rate of the imaging sensor 118.

Figure 6:
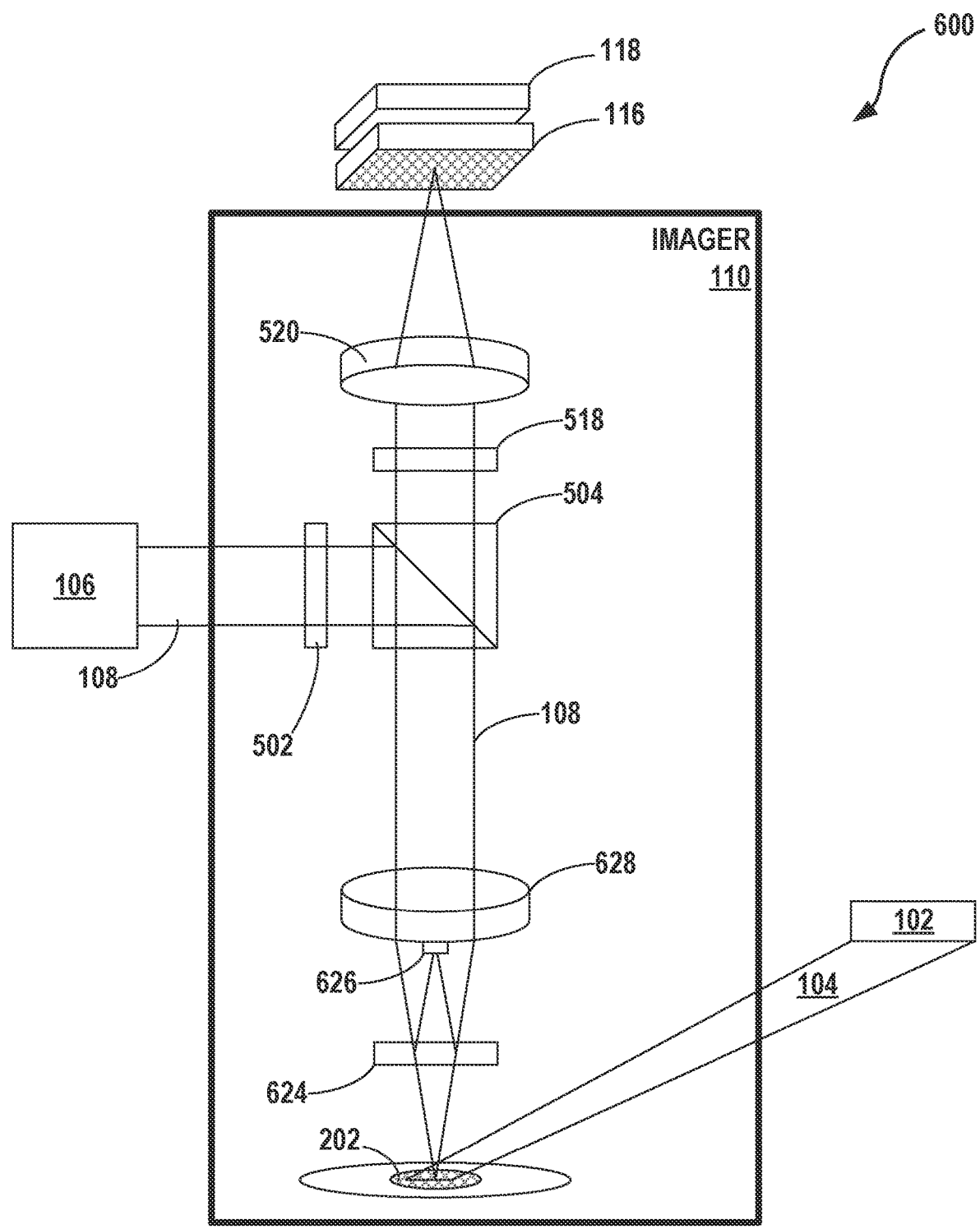
FIG. 6 is a conceptual diagram of an example of the system of FIG. 1 in which oblique IR illumination and the PPM are combined with a Mirau-type polarization interferometer.

FIG. 6 is a conceptual diagram of a sample-analysis system 600, which is an example of sample-analysis systems 100 and 500, apart from any differences explicitly noted herein. In particular, system 600 of FIG. 6 represents an example of system 100 in which imager 110 is arranged in a Mirau-type interferometer configuration. As with system 500 of FIG. 5, probe radiation 108 from probe source 106 again passes through a linear polarizer 502 established at a near-45° angle in the plane orthogonal to the direction of propagation, and through a non-polarizing beam splitter 504. The probe radiation 108 is directed into an imager (110) equipped with a Mirau objective lens modified through the introduction of a polarization thin-film beam splitter 624 that reflects incident radiation of one polarization direction while transmitting the remaining light with a polarization state orthogonal to the reflected field. Such a polarization thin-film 624 can be constructed from ellipsoid nanoparticles embedded in an optical substrate, or from an array of thin wires on an optical substrate, and can achieve extinction ratios greater than 1000:1. The reflected reference field 114A (FIG. 1) is reflected from a high-quality reflective spot 626 (with a surface roughness less than λ/4) located within the objective lens, and subsequently reflected again from the polarization thin-film beam splitter 624 for a second time before being re-collimated by the focusing elements in the objective lens 628. The transmitted test field 112A (FIG. 1) reflects off the sample under investigation 202, and transmits through the polarization beam splitter 624 for a second time before being re-collimated by the focusing elements in the objective lens 628. The test and reference fields 112A, 114A maintain their orthogonal polarizations and are converted to circular polarization states by a quarter-waveplate 518, before being focused by the tube lens 520 through the PPM 116, and onto the imaging sensor 118. IR radiation source 102 loosely focuses IR beam 104 onto the sample 202 to generate "hot" frames during the photothermal measurement.

Figure 7:
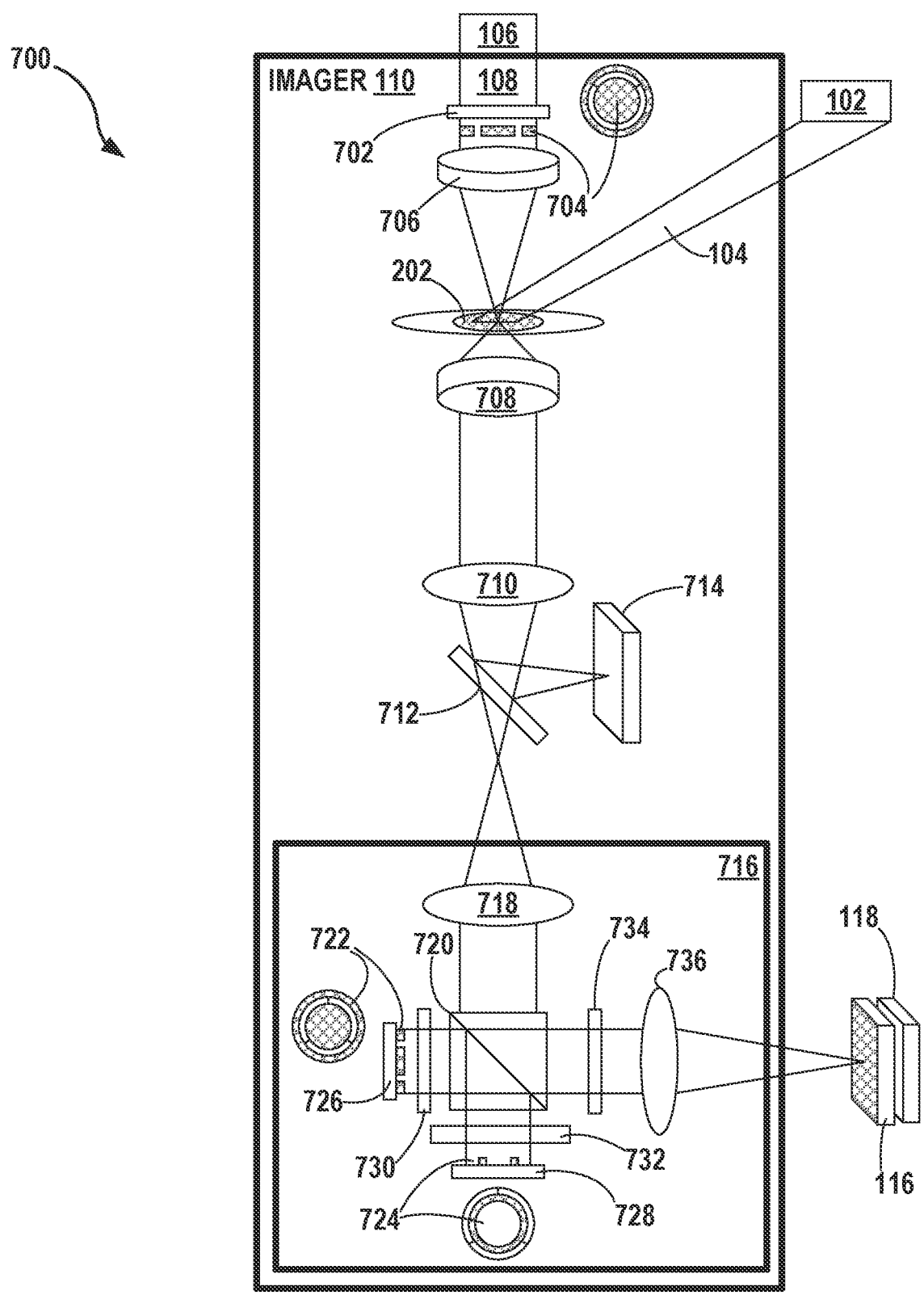
FIG. 7 is a conceptual diagram of an example of the system of FIG. 1 in which oblique IR illumination and the PPM are combined with a phase-contrast microscope/imager with complimentary spatial masks at a Fourier plane in the detection path.

FIG. 7 is a conceptual diagram of a sample-analysis system 700, which is an example of sample-analysis systems 100, 500, and 600, apart from any differences explicitly noted herein. In particular, system 700 of FIG. 7 represents an example of system 100 in which imager 110 is configured as a modified phase-contrast microscope. Here, the probe radiation 108 transmits through a linear polarizer 702 and is spatially filtered by an annular mask 704 for ring-shaped illumination. The probe radiation 108 illuminates the sample under investigation 202 using a condenser lens 706. An objective lens 708 collects the transmitted probe radiation 108 and directs it through a tube lens 710. If a fluorescent molecule or tag is present in the sample 202, fluorescence emission may be reflected by a dichroic element 712 and imaged onto an imaging sensor 714 for multimodal imaging.

After the tube lens 710, the probe radiation 108 propagates through a 4f optical-relay system 716. Optical-relay system 716 begins with lens 718, which transforms the image plane to the Fourier plane. A non-polarizing beam splitter 720 partitions the probe radiation 108 into the test (scattered) field 112A and the reference (non-scattered) field 114A. Complementary annular masks 722, 724 are positioned atop reflective elements (or "mirrors") 726, 728, respectively, at the Fourier plane to isolate the reference field 114A from the test field 112A. These opaque annular masks 722, 724 can be made from low-cost, laser-cut cardstock and may be a different size relative to the illumination annular mask 704 depending on the magnification factor of the imaging system 700.

In one optical path between the beam splitter 720 and mirror 722, there is a quarter-waveplate 730 used to convert the polarization of the field to an orthogonal polarization state after reflection. In the other optical path, there is an optical flat 732 used to preserve the original polarization orientation while matching the common optical path length between the two fields 112A, 114B (or vice versa). The reflected fields are re-combined by the beam splitter 720 and converted to opposite-handed circular polarization by the quarter-wave plate 734. A tube lens 736 focuses the probe 108 radiation through the PPM 116 for detection by the imaging sensor 118. IR beam 104 is loosely focused onto the sample 202 to generate hot frames during the photothermal measurement.

Figure 8:
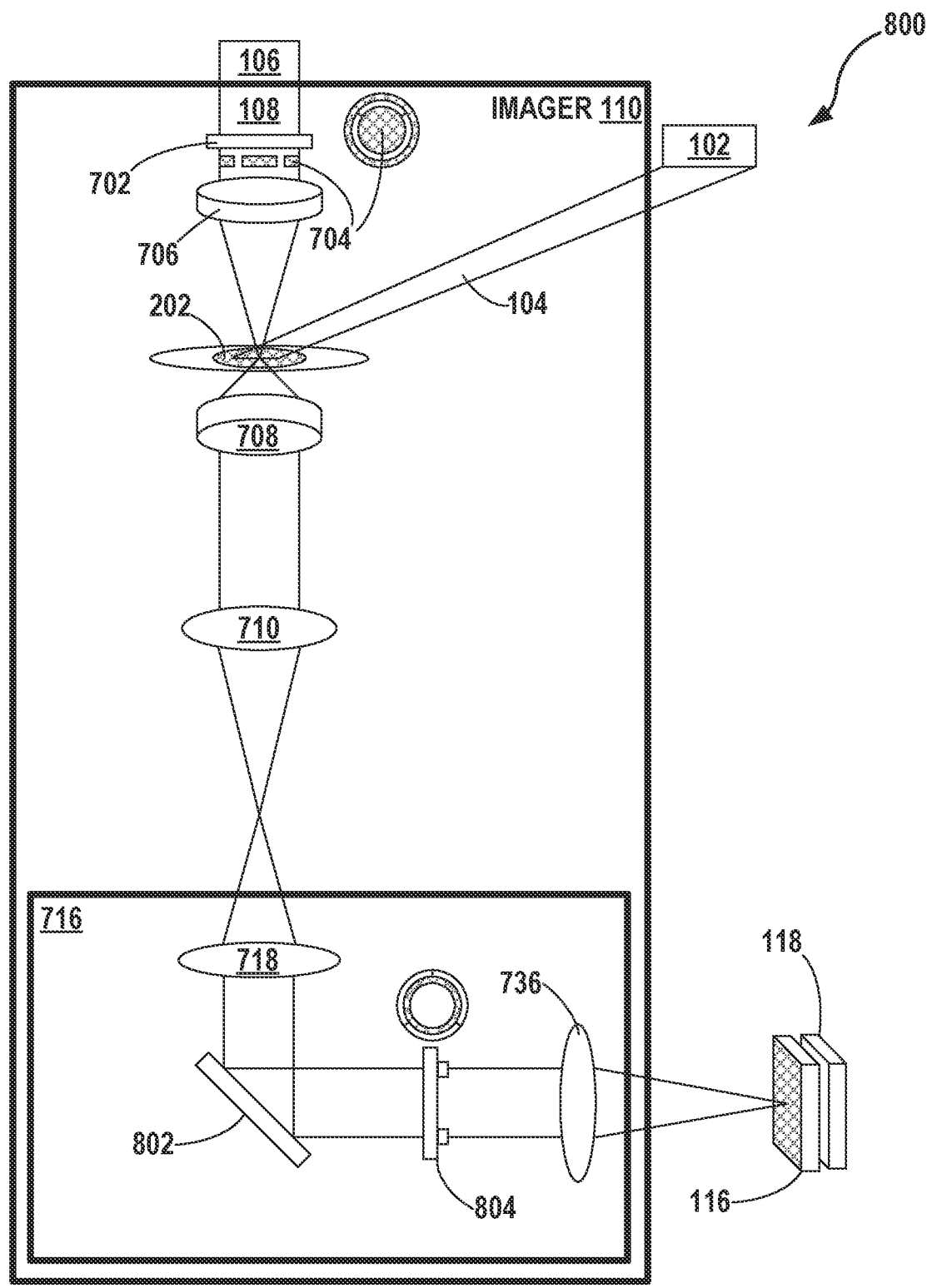
FIG. 8 is a conceptual diagram of an example of the system of FIG. 1 in which oblique IR illumination and the PPM are combined with common-path phase-contrast microscope/imager with a waveplate and an annular waveplate at a Fourier plane in the detection path.

FIG. 8 is a conceptual diagram of a sample-analysis system 800, which is an example of sample-analysis systems 100, 500, 600, and 700, apart from any differences explicitly noted herein. In particular, system 800 of FIG. 8 represents an example in which, within the detection path (i.e., the path of light after having interacted with sample 202), the optical components are configured for a common-path geometry. Here, a fold-mirror 802 is placed in the 4f optical relay 716. At the conjugate Fourier plane, a waveplate 804 is used to shift the phase of the test (scattered) field 112A differentially from the phase of the reference (non-scattered) field 114A. This is achieved through use of a waveplate 804 with an annular feature that only rotates the polarization of either the reference field 114A or the test field 112A, but not both. Such a waveplate 804 may be combined with a conventional quarter-waveplate to convert the fields 112A, 112B into orthogonal circularly polarized states, or integrated into a single waveplate such that the test (scattered) field 112A undergoes a quarter-wave phase shift while the annular-shaped reference (non-scattered) field 114A undergoes a three-quarter-wave phase shift (or vice versa). Similar to the setup of FIG. 7, a tube lens 736 focuses the probe radiation 108 through the PPM 116 for detection by the imaging sensor 118. IR radiation source 102 loosely focuses the IR beam 104 onto the sample 202 to generate hot frames during the photothermal measurement. Common-path phase imaging, as depicted in the example of FIG. 8, is particularly desirable in that it allows for improved detection sensitivity, while external sources of noise (in particular, mechanical vibrations) are simultaneously mitigated.

Figure 9:
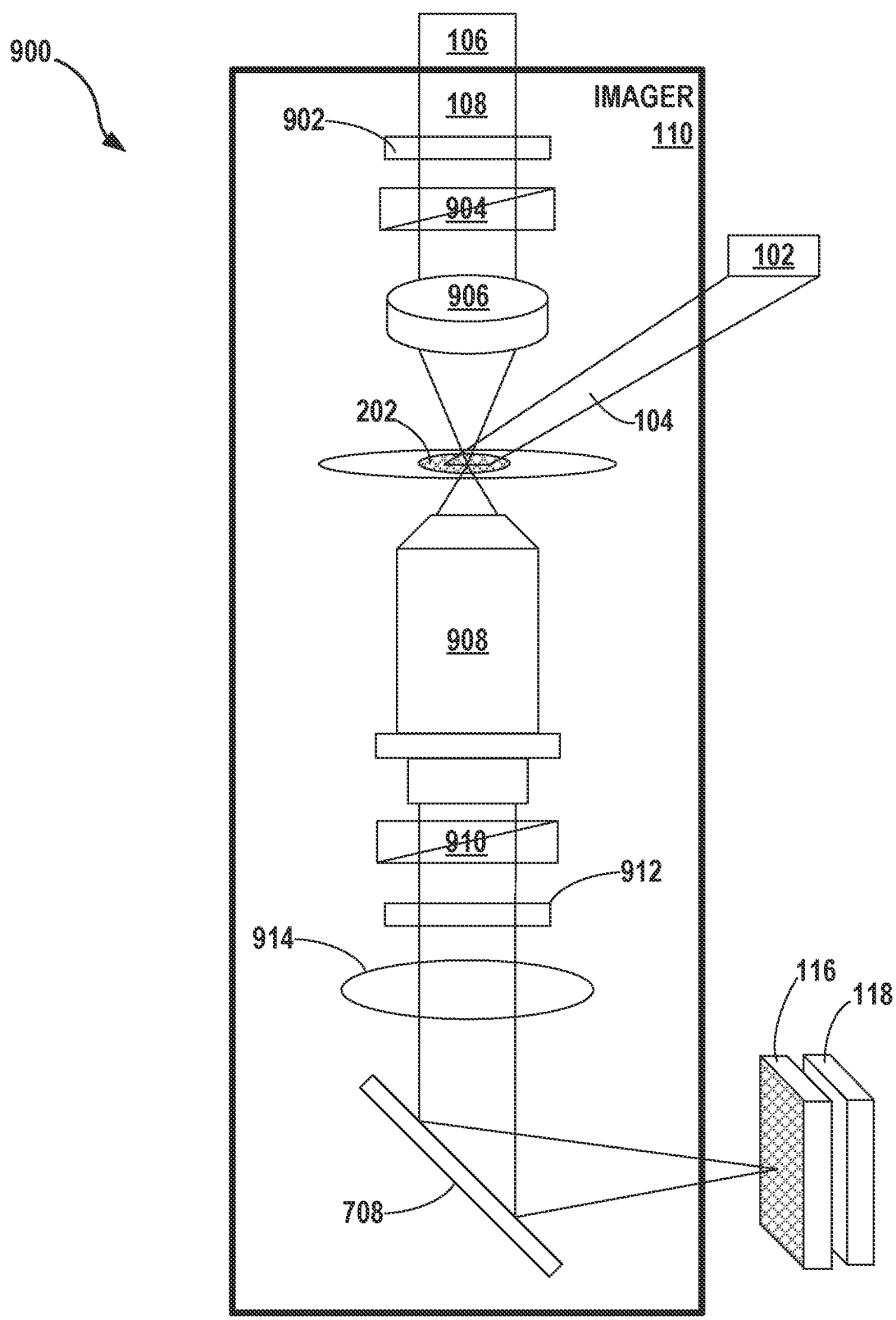
FIG. 9 is a conceptual diagram of an example of the system of FIG. 1 in which oblique IR illumination and the PPM are combined with differential interference contrast.

FIG. 9 is a conceptual diagram of a sample-analysis system 900, which is an example of sample-analysis systems 100, 500, 600, 700, and 800, apart from any differences explicitly noted herein. In particular, system 900 of FIG. 9 represents an example in which imager 110 is configured as a Differential Interference Contrast (DIC) microscope. In the present example, the DIC microscope is configured to operate in "transmission" mode, however, epi-detection DIC instruments are also available and could be readily substituted for imager 110 by those of ordinary skill in the field.

Probe radiation 108 is linearly polarized using a polarizer 902 established at a near-45° angle in the plane orthogonal to the direction of propagation. The probe radiation 108 passes through a Nomarski-type polarization-shearing prism 904 to create orthogonally polarized test and reference fields 112A, 114A, respectively. The separation distance ("shear")

between the fields 112A, 114A depends on the cut-angle of the prism 904, and is made to be less than the diffraction limit of the imaging system 900. Typical shear values are around λ/4 or less, roughly 100 nm for a high-NA lens. A condenser lens 906 illuminates the sample 202 with probe radiation 108, which is collected by the objective lens 908. A complementary Nomarski prism 910 is used to combine or overlap the test and reference fields 112A, 114A by undoing the lateral shear while preserving their orthogonal polarization states. A quarter-waveplate 912 is used to convert the fields 112A, 114A to opposite-handed circular polarizations (e.g., as in the example of FIG. 4A). A tube lens 914 then focuses the probe radiation 108 through the PPM 116 and onto the imaging sensor 118. IR radiation source 102 loosely focuses IR beam 104 onto the sample 202 to generate hot frames during the photothermal measurement. A unique advantage of the example system 900 of FIG. 9 (e.g., as compared to the previously described examples) is that DIC microscopy is capable of optical sectioning, which enables optical tomography for 3-D imaging of relatively thick and opaque samples 202. In these instances, it may be desirable to use a probe source 106 with a longer wavelength, such as a near-infrared source or even a short-wave-infrared source, to help reduce scattering.

Figure 10:
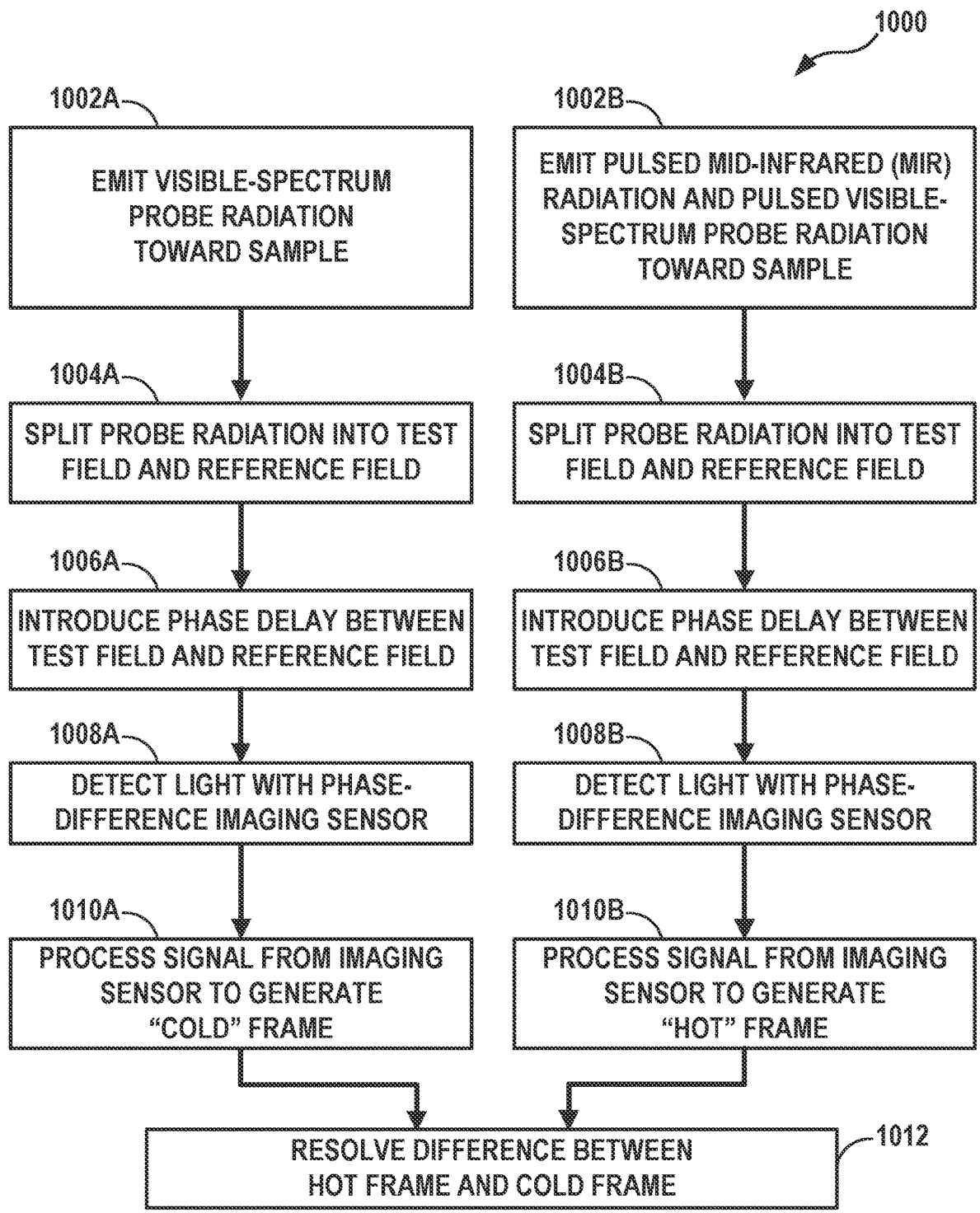
FIG. 10 is a flowchart illustrating a novel technique for infrared analysis of a sample.

FIG. 10 is a flowchart 1000 illustrating a novel technique for microscopic analysis of a sample 202 (FIGS. 2A-2E). The technique of FIG. 10 is described with reference to system 100 of FIG. 1, however, alternative systems may be devised that perform substantially the same functions.

At Step 1002A, a probe radiation source 106 is configured to emit a beam of visible-spectrum electromagnetic probe radiation 108 toward the sample 202, which is held within the frame (i.e., on the stage) of a specialized microscope or imager 110. In addition to holding the sample 202, the imager 110 houses one or more internal optical components (e.g., lenses, waveplates, mirrors, etc.)—at Step 1004A, the optical components of imager 110 split probe radiation beam 108 into a "test" field 112A and a "reference" field 114A.

The test and reference fields 112A/114A propagate outward from imager 110 and through a pixelated phase mask (PPM) 116, which, at Step 1006A, introduces a phase delay between the test and reference fields, thereby producing phase-offset test field 112B and phase-offset reference field 114B. At Step 1008A, the sensor array of an imaging sensor 118 detects the phase-offset fields 112B/114B, and outputs a corresponding signal. At Step 101A computing device 130 is configured to process this signal into a "cold" image frame.

Before, after, and/or during (e.g., interleaved with) Steps 1002A-1010A, sample-analysis system 100 also performs Steps 1002B-1010B. Steps 1002B-1010B are identical to Steps 1002A-1010A, respectively, except that, in addition to the visible-spectrum probe radiation source 106, in Step 1002B an infrared radiation source 102 emits a pulsed, mid-infrared (MIR) radiation beam 104 toward sample 202 held by imager 110. Thus, in Step 1008B, imaging sensor 118 is configured to detect the probe radiation beam 108 after passing through PPM 116, where the optical path length has been modified by the presence of IR beam 104. Accordingly, instead of the "cold" frame of Step 1010A, computing device 130 uses the signal from imaging sensor 118 to generate a "hot" image frame in Step 1010B.

Finally, having generated both a cold frame (at 1010A) and a hot frame (at 1010B), computing device 130 is configured to apply one or more image-processing algorithms, at Step 1212, to resolve the difference between the hot frame and the cold frame to produce a high-spectroscopic-contrast image of sample 202. Most significantly, the steps of flowchart 1000 can be run rapidly and continuously, e.g., at-or-above standard video-framerate speeds, ideal for capturing real-time imagery of biological or other dynamic samples.

Whereas many alterations and modifications of the disclosure will become apparent to a person of ordinary skill in the art after having read the foregoing description, it is to be understood that the particular embodiments shown and described by way of illustration are in no way intended to be considered limiting. For example, the invention has been described throughout using primarily linearly polarized test and reference fields, but it is clear that circularly polarized fields could work just as well in all of the disclosed systems, so long as they are orthogonally polarized. Furthermore, the subject matter has been described with reference to certain embodiments, but obvious variations thereof within the spirit and scope of the disclosure will occur to those skilled in the art. It is noted that the foregoing examples have been provided merely for the purpose of explanation and are in no way to be construed as limiting of the present disclosure.

Insubstantial changes from the claimed subject matter as viewed by a person with ordinary skill in the art, now known or later devised, are expressly contemplated as being equivalently captured within the scope of the following claims. Therefore, obvious substitutions now or later known to one with ordinary skill in the art are defined to be within the scope of the defined elements.

The techniques described herein may be implemented in hardware, software, firmware, or any suitable combination thereof. If implemented in software, the functions may be stored as instructions or code on a computer-readable medium and executed by a hardware-based processing unit, such as computing device 130 of FIG. 1. Computer-readable media may include non-transitory computer-readable media, which corresponds to a tangible medium such as data storage media (e.g., RAM, ROM, EEPROM, flash memory, or any other medium that can be used to store desired program code in the form of instructions or data structures and that can be accessed by a computer).

Instructions may be executed by one or more processors, such as one or more digital-signal processors (DSPs), general-purpose microprocessors, application-specific integrated circuits (ASICs), field-programmable logic arrays (FPGAs), or other equivalent integrated or discrete-logic circuitry. Accordingly, the term "processor" as used herein may refer to any of the foregoing structures or any other physical structure suitable for implementation of the described techniques, such as circuits or logic elements.

What is claimed is:

1. A system for microscopic analysis of a sample, the system comprising:
   a first radiation source configured to emit a first radiation beam onto a first area of the sample, wherein the first radiation beam comprises pulsed infrared (IR) light having a wavelength of about 2 microns to about 20 microns;
   a second radiation source configured to emit a second radiation beam onto a second area of the sample, wherein the second radiation beam comprises ultraviolet (UV) light, visible-spectrum light, or near-IR light, and wherein the second area of the sample at least partially overlaps with the first area of the sample;
   an imager comprising:
      a stage configured to retain the sample; and
      one or more optical components configured to split the second radiation beam into a test field and a reference field;

a pixelated phase mask (PPM) configured to introduce a predetermined phase shift between the test field and the reference field;

an imaging sensor configured to detect the test field and the reference field and output an electrical signal indicating optical intensities of the test field and the reference field; and processing circuitry configured to generate imagery of the sample based on the electrical signal and the predetermined phase shift.

2. The system of claim 1, wherein the one or more optical components of the imager are configured to split the second radiation beam into the test field and the reference field such that the test field and the reference field are orthogonally circularly polarized, and wherein the PPM comprises oriented linear polarizers.

3. The system of claim 1, wherein the one or more optical components of the imager are configured to split the second radiation beam into the test field and the reference field such that the test field and the reference field are orthogonally linearly polarized, and wherein the PPM comprises linear polarizers and a phase-shifting quarter-waveplate.

4. The system of claim 1, wherein the PPM and the imaging sensor are positioned proximate a common image plane or at conjugate image planes.

5. The system of claim 1, wherein:
the PPM comprises a plurality of polarizers;
the plurality of polarizers comprises between three polarizers and eight polarizers, inclusive; and
each of the plurality of polarizers is uniquely oriented relative to the rest of the plurality of polarizers.

6. The system of claim 1, wherein the first radiation beam is configured to excite molecular vibrations of molecules present in the sample, or of a molecular probe, an isotope probe, a label, or a contrast agent present in the sample.

7. The system of claim 1, wherein the first radiation source is arranged in an oblique-illumination configuration, a collinear-illumination configuration, or a counterpropagating-illumination configuration relative to the second radiation source.

8. The system of claim 1, wherein the second radiation source is arranged in a transmission-detection configuration or an epi-detection configuration relative to the imager.

9. The system of claim 1, further comprising a plurality of imaging sensors including the imaging sensor, wherein the system is further configured to perform multimodal imaging of the sample.

10. The system of claim 1, further comprising a spatial light modulator or diffuser configured to modify or shape an optical wavefront of the first or second radiation beam.

11. The system of claim 1, wherein the processing circuitry is further configured to synchronize activations of the first radiation source and the second radiation source in order to acquire first imagery in which both the first radiation beam and the second radiation beam are emitted, and second imagery in which only the second radiation beam is emitted.

12. The system of claim 1, further comprising a Bayer pixelated wavelength filter optically aligned with the PPM.

13. The system of claim 1, wherein the one or more optical components of the imager comprise an optical beam splitter arranged in a Michelson geometry or a Mach-Zehnder geometry to split the second radiation beam into the test field and the reference field.

14. The system of claim 1, wherein the one or more optical components of the imager comprise a Wollaston prism, a Nomarski prism, or a diffraction grating configured to split the second radiation beam into the test field and the reference field.

15. The system of claim 1, wherein the one or more optical components of the imager are arranged in a Fizeau configuration or a Mireau configuration.

16. The system of claim 1, further comprising an annular illumination spatial filter and a corresponding annular waveplate or annular mask at a conjugate pupil plane.

17. The system of claim 1, wherein the PPM comprises a plurality of phase-mask-pixel sets each configured to produce a respective predetermined phase shift between the test field and the reference field.

18. The system of claim 17, wherein the imaging sensor is optically aligned with the PPM, and wherein each of the plurality of phase-mask-pixel sets is aligned with a corresponding sensor-pixel set of the imaging sensor.

19. The system of claim 1, wherein the processing circuitry is configured to generate the imagery of the sample by:
performing an interferometric measurement based on the predetermined phase shift between the test field and the reference field; and
characterizing IR absorption features for each of a plurality of spatially resolved locations of the sample corresponding to widefield imaging.

20. A method of analyzing a sample, the method comprising:
emitting, by a first radiation source, a first radiation beam onto the sample, wherein the first radiation beam comprises pulsed infrared (IR) light;
emitting, by a second radiation source, a second radiation beam onto the sample, wherein the second radiation beam comprises ultraviolet (UV) light, visible-spectrum light, or near-IR light;
splitting, by an imager holding the sample, the second radiation beam into a test field and a reference field;
introducing, by a pixelated phase mask, a predetermined phase delay between the test field and the reference field;
detecting, by an imaging sensor, the test field and the reference field and outputting an electrical signal indicating detected optical intensities; and
generating, by a computing device, imagery of the sample based on the electrical signal and the predetermined phase delay.

* * * * *